United States Patent
Singaraju et al.

(10) Patent No.: US 11,551,135 B2
(45) Date of Patent: Jan. 10, 2023

(54) TECHNIQUES FOR GENERATING A HIERARCHICAL MODEL TO IDENTIFY A CLASS AMONG A PLURALITY OF CLASSES

(71) Applicant: Oracle International Corporation, Redwood Shores, CA (US)

(72) Inventors: Gautam Singaraju, Dublin, CA (US); Jiarui Ding, Foster City, CA (US); Sangameswaran Viswanathan, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1140 days.

(21) Appl. No.: 16/147,270

(22) Filed: Sep. 28, 2018

(65) Prior Publication Data
US 2019/0102701 A1    Apr. 4, 2019

Related U.S. Application Data

(60) Provisional application No. 62/566,219, filed on Sep. 29, 2017.

(51) Int. Cl.
*G06F 7/00* (2006.01)
*G06N 20/00* (2019.01)
(Continued)

(52) U.S. Cl.
CPC .......... *G06N 20/00* (2019.01); *G06F 16/2246* (2019.01); *G06F 16/285* (2019.01);
(Continued)

(58) Field of Classification Search
CPC .......... G06N 20/00; G06N 20/10; G06N 3/08; G06F 5/003; G06F 16/322; G06F 16/285;
(Continued)

(56) References Cited

U.S. PATENT DOCUMENTS

| 2011/0109485 A1 | 5/2011 | Kataoka et al. |
| 2013/0073465 A1 | 3/2013 | Richey |

(Continued)

OTHER PUBLICATIONS

Chen, "Hierarchical SVM", Available on internet at: http://www.csr.utexas.edu/hyperspectral/oldwebsite/yangchi/HSVM.htm, accessed from the internet on Jul. 3, 2018, 1 page.
(Continued)

*Primary Examiner* — Isaac M Woo
(74) *Attorney, Agent, or Firm* — Kilpatrick Townsend & Stockton LLP

(57) ABSTRACT

Techniques disclosed herein relate to generating a hierarchical classification model that includes a plurality of classification models. The hierarchical classification model is configured to classify an input into a class in a plurality of classes and includes a tree structure. The tree structure includes leaf nodes and non-leaf nodes. Each non-leaf node has two child nodes associated with two respective sets of classes in the plurality of classes, where a difference between numbers of classes in the two sets of classes is zero or one. Each leaf node is associated with at least two but fewer than a first threshold number of classes. Each of the leaf nodes and non-leaf nodes is associated with a classification model in the plurality of classification models of the hierarchical classification model. The classification model associated with each respective node in the tree structure can be trained independently.

20 Claims, 19 Drawing Sheets

(51) Int. Cl.

| | |
|---|---|
| *G06F 16/28* | (2019.01) |
| *G06F 16/22* | (2019.01) |
| *H04L 51/04* | (2022.01) |
| *G06N 5/00* | (2006.01) |
| *H04L 51/02* | (2022.01) |
| *G06F 16/9032* | (2019.01) |
| *G06N 20/10* | (2019.01) |
| *G06F 40/35* | (2020.01) |
| *G06N 3/08* | (2006.01) |
| *G10L 15/06* | (2013.01) |
| *G10L 15/18* | (2013.01) |
| *G06F 16/31* | (2019.01) |
| *G06F 16/35* | (2019.01) |
| *G06F 16/33* | (2019.01) |
| *G06K 9/62* | (2022.01) |
| *G10L 15/16* | (2006.01) |

(52) U.S. Cl.
CPC ........ *G06F 16/322* (2019.01); *G06F 16/3331* (2019.01); *G06F 16/35* (2019.01); *G06F 16/90332* (2019.01); *G06F 40/35* (2020.01); *G06K 9/627* (2013.01); *G06K 9/6227* (2013.01); *G06N 3/08* (2013.01); *G06N 5/003* (2013.01); *G06N 20/10* (2019.01); *G10L 15/063* (2013.01); *G10L 15/1815* (2013.01); *H04L 51/02* (2013.01); *H04L 51/04* (2013.01); *G10L 15/16* (2013.01); *G10L 2015/0638* (2013.01)

(58) Field of Classification Search
CPC ................. G06F 16/2246; G06F 16/35; G06F 16/90332; G06F 16/3331; G06F 40/35; G06K 9/6227; G06K 9/627; G10L 15/063; G10L 15/1815; H04L 51/02; H04L 51/04
USPC ..................................... 707/600–899; 706/12
See application file for complete search history.

(56) References Cited

U.S. PATENT DOCUMENTS

| | | |
|---|---|---|
| 2015/0170000 A1 | 6/2015 | Yang et al. |
| 2015/0188935 A1 | 7/2015 | Vasseur et al. |
| 2015/0356376 A1 | 12/2015 | Burghouts |
| 2016/0239595 A1 | 8/2016 | Maes et al. |
| 2016/0357795 A1 | 12/2016 | Sundstrom |
| 2017/0168668 A1 | 6/2017 | Sun |
| 2017/0330109 A1 | 11/2017 | Maughan et al. |
| 2018/0174578 A1* | 6/2018 | Bangalore ............ G06F 40/137 |
| 2018/0192303 A1 | 7/2018 | Hui et al. |
| 2019/0050755 A1 | 2/2019 | Murakami et al. |

OTHER PUBLICATIONS

Chen et al., "Integrating Support Vector Machines in a Hierarchical Output Space Decomposition Framework", IEEE, vol. 2, Sep. 2004, pp. 949-952.
Marchick, "VoiceLabs Path Explorer for Amazon Alexa and Google Assistant Analytics" http://voicelabs.co/2017/03/23/voicelabs-path-explorer-dive-deeper-in-voice-pathing-for-amazon-alexa-and-google-assistant-analytics/, Mar. 23, 2017, accessed from the internet on Oct. 23, 2018, 6 pages.
U.S. Appl. No. 16/147,273, Application as filed on Sep. 28, 2018, 90 pages.
U.S. Appl. No. 16/147,266, Application as filed on Sep. 28, 2018, 77 pages.
U.S. Appl. No. 16/147,249, Application as filed on Sep. 28, 2018, 139 pages.
Oracle Intelligent Bots, Oracle Mobile Cloud Enterprise—Data Sheet, Integrated Cloud Application & Platform Service, Copyright Sep. 2017, 5 pages.
Building Intelligent Chatbots, Oracle Developers, https://developer.oracle.com/chatbots, accessed from the internet on Oct. 31, 2018, 5 pages.
Uliyar, A Primer: Oracle Intelligent Bots, Powered by artificial intelligent, White Paper, Sep. 2017, 28 pages.
U.S. Appl. No. 16/147,273, Notice of Allowance dated May 19, 2020, 9 pages.

* cited by examiner

| Create Tree {create tree using recursion} | ```
public void create(MITIEHeirarchicalTreeNode<MITIEHeirarchicalLabelClass>
labels, int size){
    // stop splitting when the size is less than the split size.
    if (labels.data.size() <= size)
        return;
    List<MITIEHeirarchicalLabelClass> temp = labels.data.split();
    labels.add(temp.get(0), temp.get(1));
    this.create(labels.left, size);
    this.create(labels.right, size);
} public MITIEHeirarchicalTreeNode<MITIEHeirarchicalLabelClass>
createClasses(List<String> labels, int size, Bot bot) {
    MITIEHeirarchicalLabelClass l = new MITIEHeirarchicalLabelClass(labels);
    MITIEHeirarchicalTreeNode<MITIEHeirarchicalLabelClass> root = new
MITIEHeirarchicalTreeNode<MITIEHeirarchicalLabelClass>(l);
    this.create(root, size);
    return root;
}
``` |

FIG. 12

| | |
|---|---|
| Train (1st highlighted part creates dataset for binary classifier and 2nd creates leaf data set for multiclass) | ```java
public byte[] train(String Name, Bot bot, IDataHandler dataHandler,
boolean useIntent, int mitieThreads,
    int level1ClassSize) throws IOException
{
  List<String> dLabels = (List<String>) dataHandler.getDataLabels();
  Set<String> dataLabelSet = new HashSet<String>();
  ModelDataCompressUtil compressor = new ModelDataCompressUtil();
  if (useIntent)
    for (String label : dLabels)
      dataLabelSet.add(dataHandler.getDataUnitForLabel(label).getIntent());

List<String> dataLabels = new ArrayList<String>(dataLabelSet);

MITIEHeirarchicalClassCreatorUsingTree classCreator = new
MITIEHeirarchicalClassCreatorUsingTree();
  MITIEHeirarchicalTreeNode<MITIEHeirarchicalLabelClass> classes =
classCreator.createClasses(dataLabels,
      level1ClassSize, bot);
  Map<String, byte[]> model = new HashMap<String, byte[]>();
  String filePathTowordFeatureExtractor =
NativeUtils.getTempPathFromJar("/tmp",
"/total_word_feature_extractor.dat");

if (classes != null)
  {
    Stack<MITIEHeirarchicalTreeNode<MITIEHeirarchicalLabelClass>>
stack = new
Stack<MITIEHeirarchicalTreeNode<MITIEHeirarchicalLabelClass>>();
    stack.push(classes);
    while (!stack.isEmpty())
    {
      MITIEHeirarchicalTreeNode<MITIEHeirarchicalLabelClass> node =
stack.pop();
      if (node != null && node.data.size() > 0)
      {
        MITIEHeirarchicalModelPair data = null;

if (node.data.size() <= level1ClassSize)
        {
          data = this.createInterClassDataSet(dataHandler, node,
bot);
        } else
        {
``` |

FIG. 13A

```
List<MITIEHeirarchicalTreeNode<MITIEHeirarchicalLabelClass>> children
= new
ArrayList<MITIEHeirarchicalTreeNode<MITIEHeirarchicalLabelClass>>();
            if (node.left!=null)
               children.add(node.left);
            if (node.right!=null)
               children.add(node.right);
            data = this.createIntraClassDataSet(dataHandler, children,
bot);
        }
        TextCategorizerTrainer trainer = new
TextCategorizerTrainer(filePathToWordFeatureExtractor);
        trainer.setThreadNum(mitieThreads);
        trainer.addTrainingData(data.getData());
        // feature needs not be explicitly set on the machine where
extract
        // features is called.
        // the features can be serialized and set.
        trainer.extractFeatures();
        byte[] modelObject = compressor.compress(trainer.train());
        // if the model size is 0, this is the root.
        if (model.size() == 0)
           model.put(MITIEHeirarchicalModelConstants.baseModel,
data.getLabel().getBytes());
        model.put(data.getLabel(), modelObject);

/*
         * generate data and model for (left, right); if
(currentLevel ==
         * depth) generate data and model for (left) generate data
and model
         * for (right)
         */
        stack.push(node.right);
        stack.push(node.left);
      }
    }
  }
```

FIG. 13B

TECHNIQUES FOR GENERATING A HIERARCHICAL MODEL TO IDENTIFY A CLASS AMONG A PLURALITY OF CLASSES

CROSS-REFERENCE TO RELATED APPLICATIONS

The present application claims the benefit of and priority to U.S. Provisional Patent Application No. 62/566,219, filed on Sep. 29, 2017, entitled "Techniques For Improving A Bot System," the entire content of which is herein incorporated by reference for all purposes.

BACKGROUND

Many users around the world are on instant messaging or chat apps in order to get instant reaction. Organizations often use instant messaging or chat platforms to engage with customers or end users intelligently and contextually in live conversation. However, it can be very costly for organizations to employ service people to engage in live communication with customers or end users. A chatbot or bot is a computer program designed to simulate conversations with human users, especially over the Internet. End users can communicate with bots through many messaging apps that the end users have already installed and used, without the need to individually download and install new apps from, for example, an App store. An intelligent bot, generally powered by artificial intelligence (AI), can improve the conversational experience, allowing a more natural conversation between the bot and the end user. Instead of the end user learning a fixed set of keywords or commands that the bot knows how to respond to, an intelligent bot may be able to understand the end user's intention based on user utterances in natural language and respond accordingly. In many cases, determining the end user's intent in order to respond properly is a challenging task in part due to the subtleties and ambiguity of natural languages.

SUMMARY

Techniques disclosed herein relate generally to a hierarchical classification model, and more particularly, to creating and/or querying a hierarchical classification model for identifying classifications (e.g., determining user intents) based on user input data. Various inventive embodiments are described herein, including methods, systems, non-transitory computer-readable storage media storing programs, code, or instructions executable by one or more processors, and the like.

In certain embodiments, a computer-implemented method of generating a hierarchical classification model for classifying an input into a class in a plurality of classes is disclosed. The method may include associating, by a computer system, the plurality of classes with a root node on a first layer of a tree structure representing the hierarchical classification model, where the hierarchical classification model may include a plurality of classification models. The method may also include generating, by the computer system, the tree structure for the hierarchical classification model, and training, independently by one or more computer systems, the classification model associated with each respective node in the tree structure. The tree structure may include leaf nodes and non-leaf nodes. Each non-leaf node may have two child nodes associated with two respective sets of classes in the plurality of classes, where a difference between numbers of classes in the two sets of classes may be zero or one. Each leaf node may be associated with at least two but fewer than a first threshold number of classes. Each of the leaf nodes and the non-leaf nodes is associated with a classification model in the plurality of classification models of the hierarchical classification model.

In some embodiments, generating the tree structure may include assigning the plurality of classes to two child nodes on a second layer of the tree structure, where a difference between numbers of classes associated with the two child nodes on the second layer may be zero or one. In some embodiments, generating the tree structure may also include assigning, based on determining that the number of classes associated with a child node on the second layer is equal to or greater than the first threshold number, classes associated with the child node on the second layer to two child nodes on a third layer of the tree structure, where a difference between numbers of classes associated with the two child nodes on the third layer may be zero or one. In some embodiments, assigning the plurality of classes to the two child nodes on the second layer may include selecting, randomly from the plurality of classes, classes to be associated with each of the two child nodes on the second layer.

In some embodiments, training the classification model associated with each respective node in the tree structure may include training, for a non-leaf node, a binary classification model for classifying inputs into two groups of classes, where each group may be associated with a respective child node of the two child nodes of the non-leaf node. In some embodiments, training the classification model associated with each respective node in the tree structure may include training, for a leaf node, a multiclass classification model for classifying inputs into individual classes associated with the leaf node. In some embodiments, the binary classification model may include a support vector machine (SVM) classifier, a logistic regression classifier, a naive Bayes classifier, a decision tree classifier, a nearest neighbor classifier, or a neural network classifier. In some embodiments, the multiclass classification model may be configured to classify the inputs into two or more individual classes in the plurality of classes. In some embodiments, the multiclass classification model may include a multiclass support vector machine (SVM) classifier, a K-nearest neighbors classifier, or a neural network classifier.

In some embodiments, training the classification model associated with each respective node in the tree structure may include training, concurrently, multiple classification models associated with multiple nodes in the tree structure. In some embodiments, the computer system may include a computer, a server, a distributed computer system, or a cloud-based computer system. In some embodiments, training the classification model associated with each respective node in the tree structure may include training, concurrently on a same processor or on different processors of the computer system, multiple classification models associated with multiple nodes in the tree structure. In some embodiments, the computer-implemented method may also include retraining or updating a classification model for a node in the tree structure without retraining or updating other classification models for other nodes in the tree structure.

In some embodiments, the first threshold number may be 6 or fewer. The leaf nodes may be on a same layer of the tree structure. A number of layers of the tree structure may be fewer than a second threshold number, where the first threshold number may be determined based on the second threshold number. The plurality of classes may include 20 or more classes. In some embodiments, the input may correspond to a user utterance to a chatbot, and the plurality of classes may correspond to user intents associated with user utterances.

In certain embodiments, a non-transitory computer readable medium may store a plurality of instructions executable by one or more processors. The plurality of instructions, when executed by the one or more processors, may cause the one or more processors to perform processing comprising: associating a plurality of classes with a root node on a first layer of a tree structure representing a hierarchical classification model that includes a plurality of classification models; generating the tree structure for the hierarchical classification model; and training the classification model associated with each respective node in the tree structure. The tree structure may include leaf nodes and non-leaf nodes. Each non-leaf node may have two child nodes associated with two respective sets of classes in the plurality of classes, where a difference between numbers of classes in the two sets of classes may be zero or one. Each leaf node may be associated with at least two but fewer than a first threshold number of classes. Each of the leaf nodes and the non-leaf nodes is associated with a classification model in the plurality of classification models of the hierarchical classification model.

In certain embodiments, a system may include one or more processors and a memory coupled to the one or more processors. The memory may store instructions, which, when executed by the one or more processors, may cause the system to: associate a plurality of classes with a root node on a first layer of a tree structure representing a hierarchical classification model that includes a plurality of classification models; generate the tree structure for the hierarchical classification model; and train the classification model associated with each respective node in the tree structure. The tree structure may include leaf nodes and non-leaf nodes. Each non-leaf node may have two child nodes associated with two respective sets of classes in the plurality of classes, where a difference between numbers of classes in the two sets of classes may be zero or one. Each leaf node may be associated with at least two but fewer than a first threshold number of classes. Each of the leaf nodes and the non-leaf nodes is associated with a classification model in the plurality of classification models of the hierarchical classification model.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

Illustrative examples are described in detail below with reference to the following figures:

FIG. 12 illustrates an example of pseudo code for creating a hierarchical classification model according to certain embodiments;

FIGS. 13A and 13B illustrate an example of pseudo code for training a hierarchical classification model according to certain embodiments;

DETAILED DESCRIPTION

Figure 1:
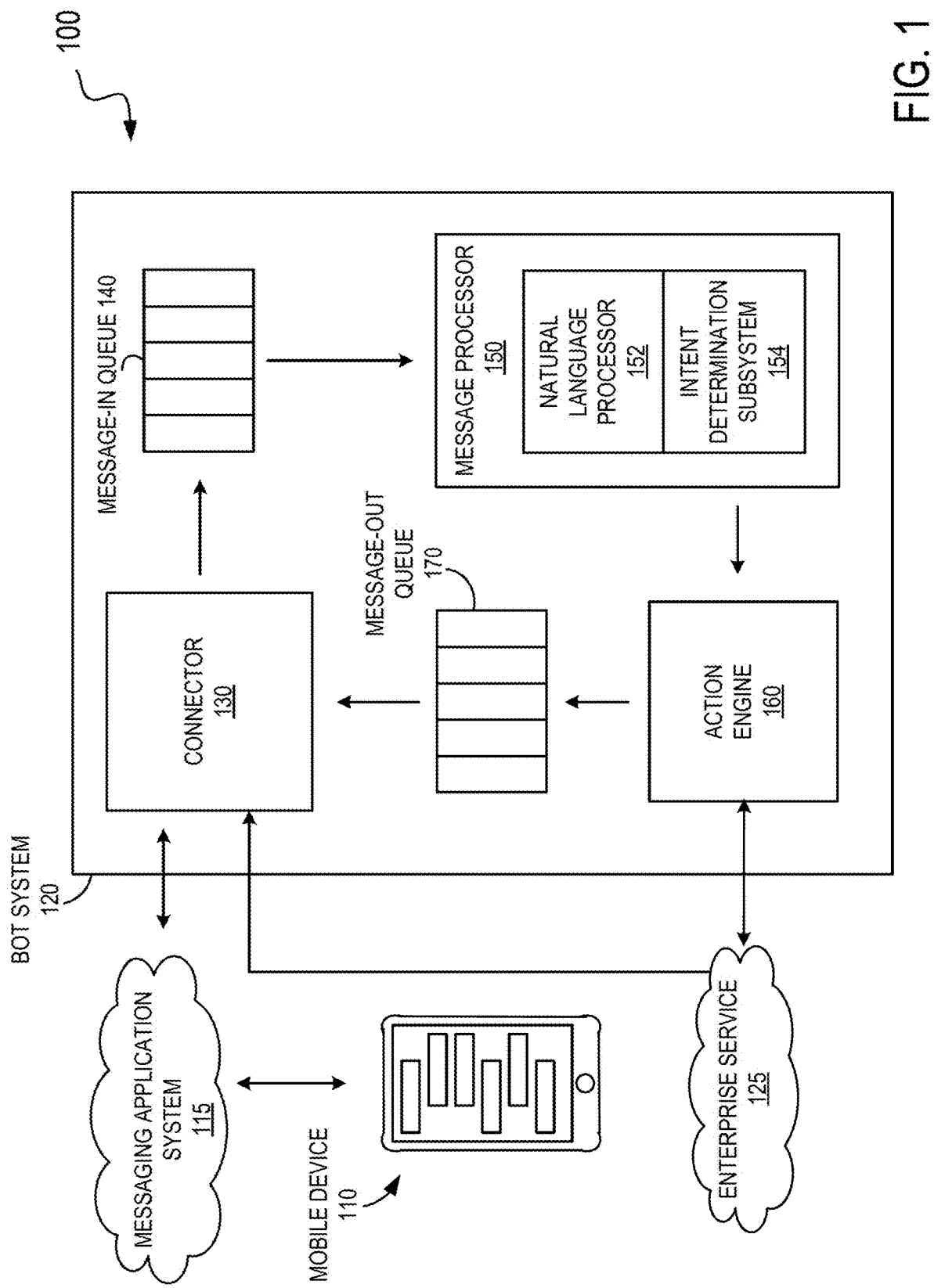
FIG. 1 depicts a distributed system that implements a bot system for communicating with an end user using a messaging application according to certain embodiments.

This disclosure related generally to a hierarchical classification model, and more particularly, to creating and/or querying a hierarchical classification model for classifying inputs into multiple classes, such as determining user intents, based on user input data. Various inventive embodiments are described herein, including methods, systems, non-transitory computer-readable storage media storing programs, code, or instructions executable by one or more processors, and the like.

In many applications, the number of classes to be classified may be large, such as more than twenty, more than fifty, more than one hundred, more than one thousand, or even more than tens of thousands in some cases (e.g., object identification and classification). Thus, in some cases, the training of a single classification model to classify inputs into individual classes may not be successful (e.g., may not converge) at the end. Furthermore, even if the training could be successful at the end, it may be time-consuming to train a single classification model that can classify inputs into many different classes. In addition, with a single classification model for classifying inputs into many different classes, the computation power and memory usage for the training and classification may be high. Thus, in many cases, it may not be practical to use a single classification model to classify inputs associated with many different classes.

According to certain embodiments, a hierarchical classification model may be used to classify different classes using two or more classification models at two or more layers of the hierarchical classification model. The hierarchical classification model may include a plurality of nodes arranged according to a tree structure, where each node may be associated with or represent a classification model of any type. Any appropriate type of classification models, such as a linear classifier (e.g., logistic regression or naive Bayes classifier), support vector machine (SVM) classifier, decision tree classifier, nearest neighbor classifier, or neural network classifier, may be independently chosen, trained, and/or updated at each node. In some embodiments, the tree structure may be a binary tree structure except at the leaf layer. Each node (except the leaf nodes) may be a binary classification model that can classify an input into two categories, where the two categories may have substantially equal numbers of classes. A user may select or define the maximum number of layers in the tree structure (e.g., fewer than 20, fewer than 10, fewer than 8, fewer than 5, or fewer than 4) and/or the maximum number of classes associated with each leaf node (e.g., fewer than 15, fewer than 10, fewer than 6, fewer than 5, or fewer than 4). As such, each leaf node may only include a small number of classes, and thus the classification models at the leaf nodes may be relatively easy to train. In addition, the tree structure may not be too deep and each inference may use a similar (e.g., with a difference of one) or same number of classification models (or going through a same number of layers in the tree structure), and thus the classification time can be short and more predictable.

Techniques disclosed herein can be used to generate a hierarchical classification model that can distinguish inputs associated with a large number of classes for any applications, including, but are not limited to, identifying intents of end users communicating with a bot system. For example, a bot system may identify an intent of an end user among many different possible intents based upon a message received from the end user, in order to respond to the end user properly.

In the following description, for the purposes of explanation, specific details are set forth in order to provide a thorough understanding of examples of the disclosure. However, it will be apparent that various examples may be practiced without these specific details.

The ensuing description provides examples only, and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims. The figures and description are not intended to be restrictive. Circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples. The teachings disclosed herein can also be applied to various types of applications such as mobile applications, non-mobile application, desktop applications, web applications, enterprise applications, and the like. Further, the teachings of this disclosure are not restricted to a particular operating environment (e.g., operating systems, devices, platforms, and the like) but instead can be applied to multiple different operating environments.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The word "example" or "exemplary" is used herein to mean "serving as an example, instance, or illustration." Any embodiment or design described herein as "exemplary" or "example" is not necessarily to be construed as preferred or advantageous over other embodiments or designs.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some examples, the systems may be configured as a distributed system where one or more components of the system are distributed across one or more networks in a cloud computing system.

Where components are described as being "configured to" perform certain operations, such configuration may be accomplished, for example, by designing electronic circuits or other hardware to perform the operation, by programming or controlling electronic circuits (e.g., microprocessors, or other suitable electronic circuits) to perform the operation, or any combination thereof.

A bot (also referred to as a chatbot, chatterbot, or talkbot) is a computer program that can simulate a conversation with human users. The bot can generally respond to natural-language messages (e.g., questions or comments) through a messaging application that uses natural-language messages. Enterprises may use one or more bot systems to communicate with end users. The messaging application, which may be referred to as a channel, may be user preferred messaging applications that the end users have already installed and familiar with. Thus, the end users do not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, a person of ordinary skill in the art will recognize that the message may be an HTTP post call message, a SMS message, or any other type of communication between two systems.

End users may interact with the bot system through a conversational interaction (sometimes referred to as a conversational user interface (UI)), just as interactions between persons. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some embodiments, the bot system may handle user interactions without interaction with an administrator of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a REST call against enterprise services with the proper parameters) and generate a natural language response. The bot system may also prompt the end user for additional input parameters or request other additional information. In some embodiments, the bot system may also initiate communication with the end user.

A conversation with a bot may go through a specific flow including multiple states. The flow may define what would happen next based on an input. In some embodiments, a state machine that includes user defined states (e.g., end user intents) and actions to take in the states or from state to state may be used to implement the bot. A conversation may take different paths based on the user input, which may impact the decision the bot makes for the flow. For example, at each state, based on the user input, the bot may determine the end user's intent in order to determine the appropriate next action to take.

An intent may include a goal that the end user would like to accomplish. An intent maps an end user input to actions that a backend system should perform for the end user. Therefore, based on the phrases uttered by the end user in natural language, the bot would map the user utterance to a specific use case or job, such as ordering pizza, getting account balance, transferring money, making a purchase, making a return, etc. Human conversations are often non-linear in nature. End users may often branch into different states during a conversation. For example, if an end user wants to transfer funds from account A to a recipient, the end user may start a conversation with the bot system by, for example, asking the bot to pay the recipient for dinner. The bot may respond with, for example, "from which account?". The end user may pick a checking account but may then realize that he or she is not sure about the balance in the account. Thus, the end user may switch context to ask for balance and recent transactions, and so on. In other words, the end user may trigger changes in the flow and states, for example, from transferring money to checking balance, and then to recent transactions. At some time point, the end user may decide to return to the original intent—paying the recipient. Thus, one task of the bot system is to determining user intents from natural language utterances.

A bot may use a natural language processing (NLP) engine and/or a machine learning model (e.g., an intent classifier) to map user utterances to specific intents. For example, a machine learning based NLP engine may learn to understand and categorize the natural language conversation from the end user and to extract necessary information from the conversation to be able to take precise actions, such as performing a transaction or looking up data from a backend system of record.

FIG. 1 depicts a distributed system 100 that may be used to implement a bot system for communicating with an end user using a messaging application according to certain embodiments. System 100 may include a bot system 120, one or more messaging application systems 115, and one or more user devices, such as one or more mobile devices 110. In some examples, the messaging application may be installed on an electronic device (e.g., a desktop computer, a laptop, mobile device 110, or the like). While the discussion herein will reference a mobile device and a messaging application, a person of ordinary skill in the art will recognize that any electronic device may be used and any messaging platform or messaging application may be used, such as FACEBOOK® Messenger, WHATSAPP® instant messaging software, WECHAT® mobile text and voice messaging communication service, KIK® Messenger, TELEGRAM® Messenger, SKYPE MOBILE® messenger, Short Message Service (SMS), or any other messaging application that provides a platform for end users to communicate. In other examples, the messaging application may be run through a browser (e.g., GOOGLE CHROME® browser, MOZILLA® FIREFOX® browser, and INTERNET EXPLORER browser) that is installed on mobile device 110. In some embodiments, two or more messaging applications may be installed on a user device for communicating through two or more messaging platforms (such as two or more messaging application systems 115).

The messaging application may be facilitated by a messaging platform, such as messaging application system 115. Mobile device 110 may be connected to messaging application system 115 by a first network (e.g., the Internet). Messaging application system 115 may be a messaging platform provided by a third party, such as Facebook, Tencent, Google, Microsoft, etc. Messaging application system 115 may manage content sent and received through the messaging application across multiple mobile devices or other user devices.

A bot system 120 (e.g., implemented on one or more servers) may also be communicatively connected to messaging application system 115 to send and receive massages. The communication between messaging application system 115 and bot system 120 may be through a second network (e.g., the Internet). The first network and the second network may be the same network, or they may be similar or completely different networks. Messaging application system 115 may route content (e.g., a message or information from a message) from mobile device 110 to bot system 120 using the Internet. In some embodiments, the destination of the content (e.g., an identification of bot system 120) may be included in the content as a nominal addressee. In some embodiments, bot system 120 may also be configured to communicate with two or more messaging application systems 115.

As discussed above, the content being exchanged between end users or between an end user and a bot system may include, for example, text, emojis, audio, media (e.g., a picture, a video, a link), or any other method of conveying a message. An example of a message received by bot system 120 from, for example, FACEBOOK® Messenger may include:

```
{
  "channel": {
    "tenant_id": "DemoTenant",
    "client_data": {
      "channel_user_id": "1103645260000000",
```
-continued
```
      "type": "facebook",
      "chat_id": "1103645260000000"
    },
    "type": "facebook",
    "bot_id": "DemoBot",
    "client_id": "facebook"
  },
  "id": "411fc848-350b-47de-89c3-a0ecee314401",
  "text": "May I have a cheese pizza?",
  "type": "text"
}
```

Bot system 120 may receive the content from messaging application system 115 using a connector 130 that acts as an interface between messaging application system 115 and bot system 120. In some embodiments, connector 130 may normalize content from messaging application system 115 such that bot system 120 may analyze content across different messaging application systems. The content normalization processing may include formatting content from each type of messaging application to a common format for processing. In some embodiments, bot system 120 may include one or more connectors for each of the messaging applications (such as FACEBOOK® Messenger, WHATSAPP instant messaging software, WECHAT® mobile text and voice messaging communication service, KIK® Messenger, TELEGRAM® Messenger, and SKYPE MOBILE® messenger, a Short Message Service (SMS)). In some implementations, connector 130 may route the content to a message-in queue 140. Message-in queue 140 may include a buffer (e.g., a first-in first-out (FIFO) buffer) that stores content in the order received. In some embodiments, each connector 130 may be associated with one or more message-in queues.

Message-in queue 140 may send the content to a message processor 150 when message processor 150 becomes available. In some embodiments, message processor 150 may pull the content from message-in queue 140. Message processor 150 may parse a message and determine an intent of the parsed message as described in detail below. In some embodiments, message processor 150 may include a natural language processor 152 and an intent determination subsystem 154. Natural language processor 152 may parse a message and perform certain semantic analysis, such as identifying a subject, a predicate (e.g., an action), and/or an object. Intent determination subsystem 154 may determine a user intent based upon the parsed message using, for example, one or more machine learning based classification models. As described above, the intent may include a purpose of the message. For example, a purpose of the message may be to order a pizza, order a computer, transfer money, ask a question regarding delivery, etc. In some embodiments, parameters associated with the intent that more specifically define or clarify the action to take, which may be referred to as entities, may also be extracted from the message by natural language processor 152 and/or intent determination subsystem 154.

After the user intent is determined based upon the content by message processor 150, the determined intent (and the parameters associated with the intent) may be sent to an action engine 160. Action engine 160 may be used to determine an action to perform based upon the intent (and the parameters associated with the intent) and the current state (or context) of a state machine as described above. For example, action engine 160 may send certain outbound content to message-out queue 170 as the response and/or may send a command to or retrieve information from some enterprise services, such as enterprise service 125. Message-out queue 170 may send the outbound content to connector 130. Connector 130 may then send the outbound content to a messaging application system indicated by action engine 160, which may be the same as or different from messaging application system 115. Messaging application system 115 may then forward the outbound content to the messaging application on mobile device 110.

Bot system 120 may communicate with one or more enterprise services (e.g., enterprise service 125), one or more storage systems for storing and/or analyzing messages received by bot system 120, or a content system for providing content to bot system 120. Enterprise service 125 may communicate with one or more of connector 130, action engine 160, or any combination thereof. Enterprise service 125 may communicate with connector 130 in a manner similar to messaging application system 115. Enterprise service 125 may send content to connector 130 to be associated with one or more end users. Enterprise service 125 may also send content to connector 130 to cause bot system 120 to perform an action associated with an end user. Action engine 160 may communicate with enterprise service 125 to obtain information from enterprise service 125 and/or to instruct enterprise service 125 to take an action identified by action engine 160.

In some embodiments, bot system 120 may include one or more timers. A timer may cause action engine 160 to send content to an end user using connector 130 and messaging application system 115 after an amount of time has lapsed. In some embodiments, a timer may send content to bot system 120 similar to an end user or enterprise service 125. For example, the timer may send a message to bot system 120 to be analyzed as a message from an end user would be analyzed.

In one specific embodiment, an end user may send a message to bot system 120 using mobile device 110 through messaging application system 115. The message may include a greeting, such as "Hello" or "Hi." The bot system may determine that a new conversation has begun with the end user and start a state machine. In some embodiments, the bot system may identify one or more characteristics of the end user. For example, the bot system may identify a name of the end user using a profile associated with the end user on the messaging application system. Using the one or more characteristics, the bot system may respond to the end user on the messaging application. The response may include a message to the end user that responds to the message received from the end user. For example, the response may include a greeting with the name of the end user, such as "Hi Tom, What can I do for you?". Depending on the enterprise associated with the bot system, the bot system may progress to accomplish a goal of the enterprise. For example, if the bot system is associated with a pizza delivery enterprise, the bot system may send a message to the end user asking if the end user would like to order pizza. The conversation between the bot system and the end user may continue from there, going back and forth, until the bot system has completed the conversation or the end user stops responding to the bot system.

In some embodiments, the bot system may initiate a conversation with an end user. The bot system-initiated conversation may be in response to a previous conversation with the end user. For example, the end user may order a pizza in the previous conversation. The bot system may then initiate a conversation when the pizza is ready. In some embodiments, the bot system may determine the pizza is ready when an indication is received from the enterprise associated with the bot system (e.g., an employee sending a message to the bot system that the pizza is ready). The conversation may include a message sent to the end user indicating that the pizza is ready.

In some embodiments, the bot system may send a message to the end user on a different messaging application than the messaging application that a previous message was received. For example, the bot system may determine to send the message using Short Message Service (SMS) rather than FACEBOOK® Messenger. In such implementations, the bot system may integrate multiple messaging applications.

In some embodiments, the bot system may determine to start a conversation based on a timer. For example, the bot system may determine to have a one-week-timer for an end user after a pizza is ordered. Expiration of the one-week timer may cause the bot system to start a new conversation with the end user for ordering another pizza. The timer may be configured by the enterprise and implemented by the bot system.

As described above, in some embodiments, action engine 160 may send command to or retrieve information from some enterprise services 125. For example, when bot system 120 (more specifically, message processor 150) determines an intent to check balance, bot system 120 may determine which of several accounts (e.g., checking or savings account) to check the balance for. If the end user inputs "What's my balance in my savings account," bot system 120 may extract "savings" and send a command to a bank server to check the balance, and then send the received balance information to the end user through a message. If the end user initially only uttered "what's the balance in my account?", bot system 120 may send a message to the end user prompting the end user to further specify the specific account, or may retrieve information for all accounts of the end user and send the account information to the end user for the end user to make a selection.

In some embodiments, the bot system may maintain information between conversations. The information may be used later so that the bot system does not need to ask some questions every time a new conversation is started between the end user and the bot system. For example, the bot system may store information regarding a previous order of pizza by the end user. In a new conversation, the bot system may send a message to the end user that asks if the end user wants the same order as last time.

In some embodiments, bot system 120 may store information associated with end users in a cache. The cache may write to a database to save the information after an outbound message is sent to the messaging application system from connector 130. In other embodiments, the cache may write to the data at different times (e.g., after a particular event, after each event, after an amount of time, or any other metric to determine when to write to the database).

Bot system 120 may allow each component to be scaled when slowdowns are identified. For example, if bot system 120 identifies that the number of messages that are arriving at connector 130 exceeds a threshold, an additional one or more connectors may be added to connector 130. In addition, the number of message-in queues, message processors, instances of action engines, and message-out queues may be increased depending on where the slowdown occurs. In such implementations, additional components may be added without having to add other additional components. For example, a connector may be added without having to add an additional instance of the action engine. In some implementations, one or more components, or a portion of a component, of bot system 120 may be run on a virtual machine. By running on a virtual machine, additional virtual machines may be initiated as desired.

In many cases, accurately determining the end user's intent by the message processor in order to respond properly is a challenging task in part due to the subtleties and ambiguity of natural languages. For example, a bot system may need to identify the end user's intent from many possible intents based upon the natural language message received from the end user. In such cases, it may be challenging to achieve both a high classification accuracy and a good generalization, in particular, when the sample sizes are small relative to the dimension of the input space and the size of the output space (number of classes) is large. Some systems may use a multiclass classification model, such as a multiclass Support Vector Machine (SVM) model to distinguish different types of classes of user intents. However, training a multiclass classification model (e.g., a multiclass SVM model) associated with a large number of classes may not always be successful. In some cases, for the training to be successful at the end, the computation power and the memory space used for the training may be very high, and thus may not be performed on some computer systems with limited computation power and/or the memory space. In some cases, the time to complete a training process may be very long. In some cases, the computation power and memory usage for the classification may be very high, and thus may not be performed on some computer systems with limited computation power and/or the memory space.

Figure 2:
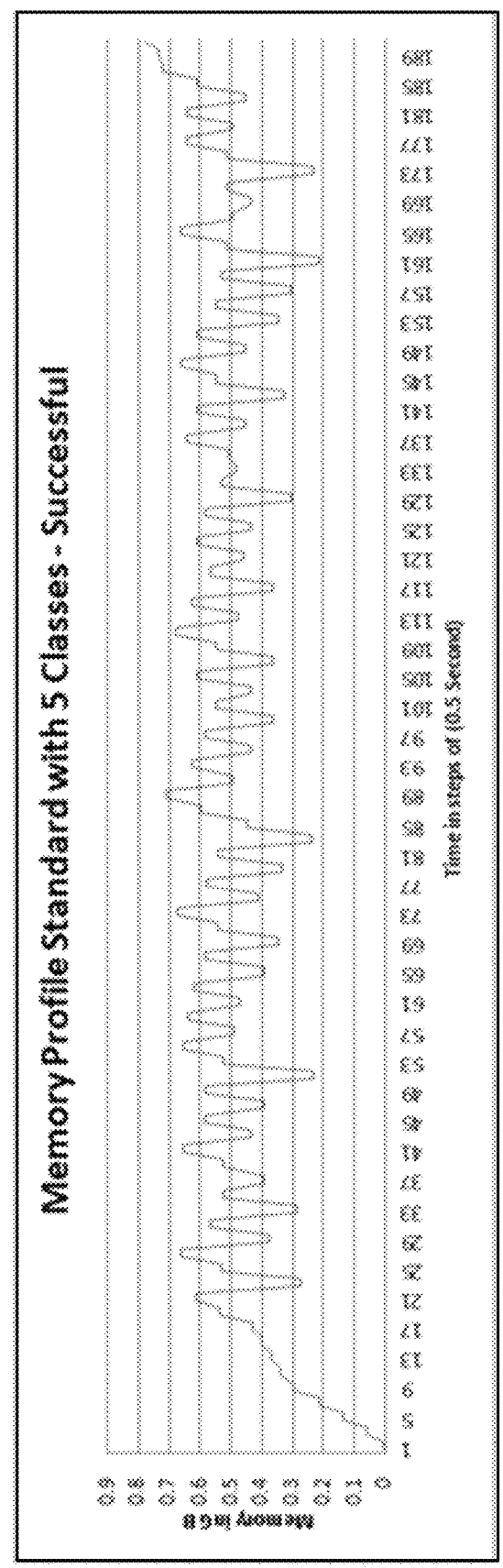
FIG. 2 illustrates an example graph depicting the memory utilization over time for training a multiclass Support Vector Machine classifier to classify inputs into five classes.

FIG. 2 illustrates an example graph 200 depicting the memory utilization over time for training a multiclass Support Vector Machine classifier to classify inputs into five classes. As illustrated, the training may be successful after about 90 seconds, and the training may use a memory space of about 0.8 gigabytes.

Figure 3:
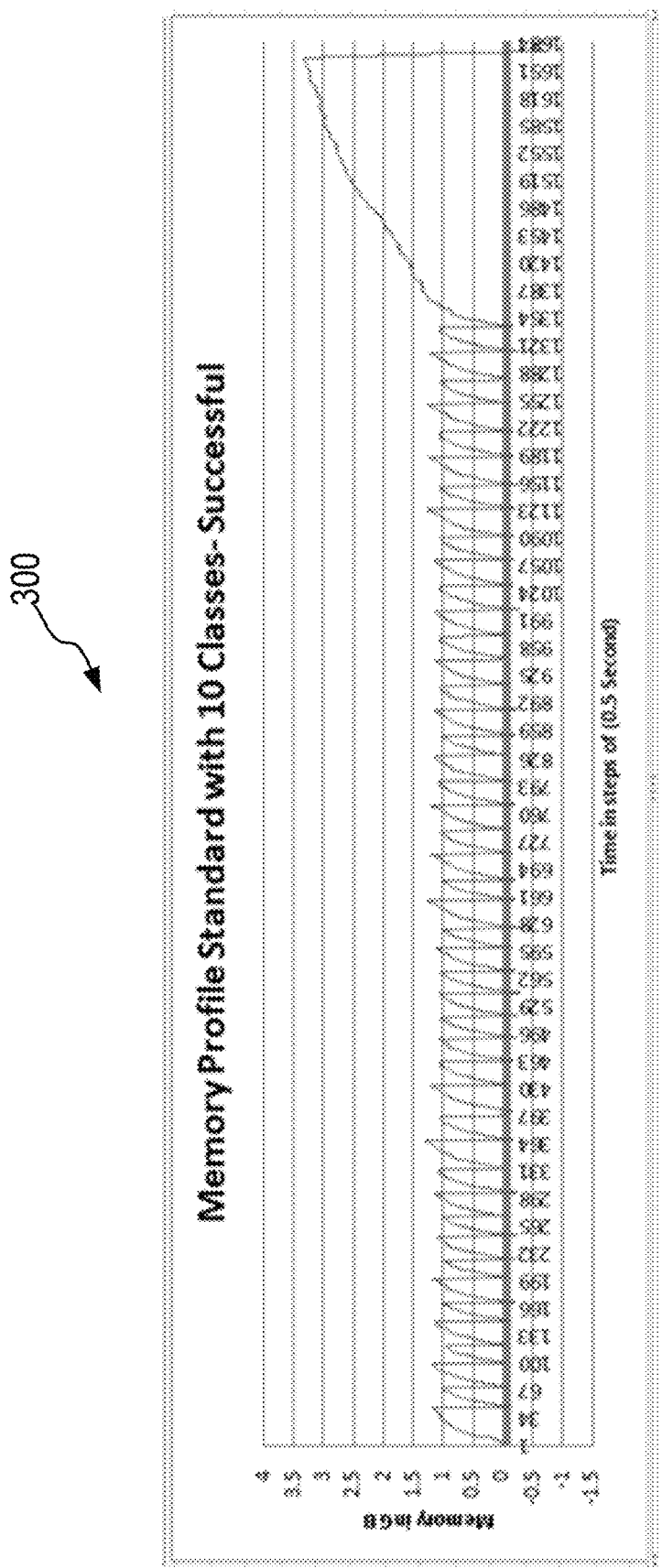
FIG. 3 illustrates an example graph depicting the memory utilization over time for training a multiclass Support Vector Machine classifier to classify inputs into ten classes.

FIG. 3 illustrates a graph 300 depicting the memory utilization over time for training a multiclass Support Vector Machine classifier to classify inputs into ten classes. As illustrated, the training may be successful after more than 800 seconds (almost 10 times longer than the training shown in FIG. 2), and the training may use a memory space of about 3.5 gigabytes.

Figure 4:
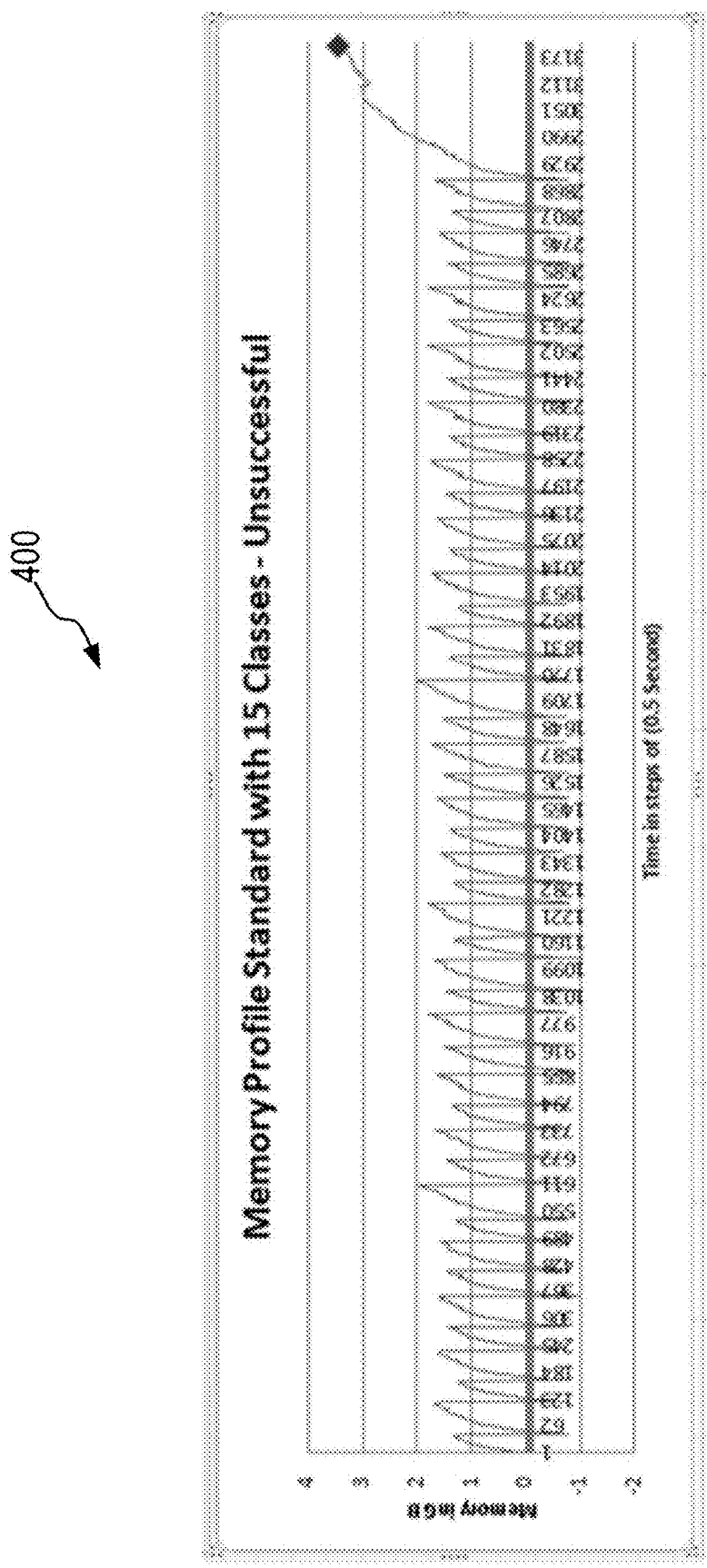
FIG. 4 illustrates an example graph depicting the memory utilization over time for training a multiclass Support Vector Machine classifier to classify inputs into fifteen classes.

FIG. 4 illustrates a graph 400 depicting the memory utilization over time for training a multiclass Support Vector Machine classifier to classify inputs into fifteen classes. As illustrated, the training may not be successfully after over 1500 seconds. Thus, it may be difficult to build a multiclass Support Vector Machine classifier for classifying inputs into 15 or more classes.

Some solutions have begun to use multiple support vector machines (SVMs) or other classification models to classify user intents. However, these solutions may use a bottom-up approach and may generally execute SVMs or other classification models to determine the probability that each class may be the actual intent of the end user, and then determine which class is most likely the actual intent of the end user based upon the probability values for all classes. Such solutions may use a lot of resources to determine the probability associated with each class.

According to certain embodiments, a hierarchical classification model may be used to classify unknown data into a set of classes that includes a large number of classes. The hierarchical classification model may classify each input into one of the classes using two or more classification models at two or more layers of the hierarchical classification model. The hierarchical classification model may have a tree structure that includes a plurality of nodes, where each node in the tree structure may be associated with a classification model of any type, such as a linear classifier (e.g., a logistic regression or naive Bayes classifier), a support vector machine (SVM) classifier, a decision tree classifier, a nearest neighbor classifier, or a neural network classifier. The classification model associated with each node may be chosen, trained, and/or updated independently.

In some embodiments, the tree structure may be a binary tree structure except at the leaf layer. Each node (except at the leaf nodes) may be associated with a binary classification model that can classify an input into one of two sets of classes, where the two sets of classes may have substantially equal number of classes (with a difference less than two). A user may select or define the maximum number of layers in the tree structure (e.g., fewer than 20, fewer than 10, fewer than 8, fewer than 5, or fewer than 4) and/or the maximum number of classes at each leaf node (e.g., fewer than 15, fewer than 10, fewer than 6, fewer than 5, or fewer than 4). As such, each leaf node may only include a small number of classes, and thus the classification models at the leaf nodes may be relatively easy to train. In addition, the tree structure may not be too deep and each inference may use a similar (e.g., with a difference of one) or same number of classification models (or going through a similar or same number of layers in the tree structure), and thus the classification time can be short and more predictable.

In one illustrative embodiment, a user may define or determine multiple classes (e.g., user intents), such as N classes, associated with a bot system. The multiple classes may be split into two sets of classes, where each set of classes may include approximately N/2 classes. In some embodiments, the N classes may be split randomly into two sets, where each set may include approximately N/2 classes (with a difference less than two). In some embodiments, the N classes may be split into two sets based on certain features or characteristics of the classes. The N classes may be associated with or assigned to the root node of a tree structure, and each of the two sets of classes may be associated with or assigned to each respective child node of two child nodes of the root node. The root node of the tree structure may include a classification model that is trained to class each input into one of the two sets of classes in the two child nodes. Each of the two child nodes may include two grandchild nodes, where approximately equal numbers of classes (e.g., approximately N/4) may be associated with or assigned to each grandchild node. Each child node may be associated with a classification model that is trained to classify an input into one of the two groups of classes associated with the two grandchild nodes. The binary tree structure may continue to grow until the leaf nodes, which may each include a classification model that is trained to classify an input into one of serval classes. The number of classes for each classification model associated with the corresponding leaf node may be two or more, which may be defined by the user, such as fewer than 15, fewer than 10, fewer than 6, or fewer than 4.

As described above, each node in the tree structure other than the leaf nodes may be associated with a classification model that is trained to distinguish between two sets of two or more classes. The classification model may be a binary classification model that can distinguish inputs associated with the two sets of classes. Each leaf nodes may be associated with two or more (e.g., three or five) classes, the classification model associated with the leaf node may be a multiclass classification model that is trained to distinguishes inputs belonging to two or more classes. In some embodiments, the classification model at each node may be trained independently. For example, some classification models may be trained concurrently.

In some embodiments, the tree structure may not be a binary tree and may include at least one non-leaf node that has more than two but fewer than a certain number (e.g., fewer than 10, fewer than 6, or fewer than 4) of child nodes, such as three child nodes or five child nodes, where the more than two child nodes may be associated with approximately equal numbers of classes. Including non-leaf nodes with more than two child nodes in the tree structure may help to reduce the depth (or the number of layers) of the tree structure, and thus reduce the total classification time for an input.

In some embodiments, the tree structure may be built first and the classification model associated with each node may then be selected and trained using training samples (e.g., user utterances and corresponding intents). The tree structure may be built by splitting all classes approximately equally (with a difference less than two) into two sets of classes at each node of the tree structure and assigning the two sets of classes to two child nodes on the next layer. The classes assigned to each child node on the next layer may then be further split approximately equally and assigned to two nodes on the next layer, until the number of classes associated with each node is fewer than a pre-determined number (e.g., fewer than 10, fewer than 6, or fewer than 4). In such a near binary tree structure, a binary classification model can be selected and trained at each non-leaf node, and thus can be trained more quickly and use less memory. At the leaf node, a multiclass classification model may be used in order to limit the height or depth of the tree structure. The classification models associated with the nodes may be trained in parallel or in serial. The classification model at each node can also be individually changed or updated without affecting other classification models associated with other nodes.

Figure 5:
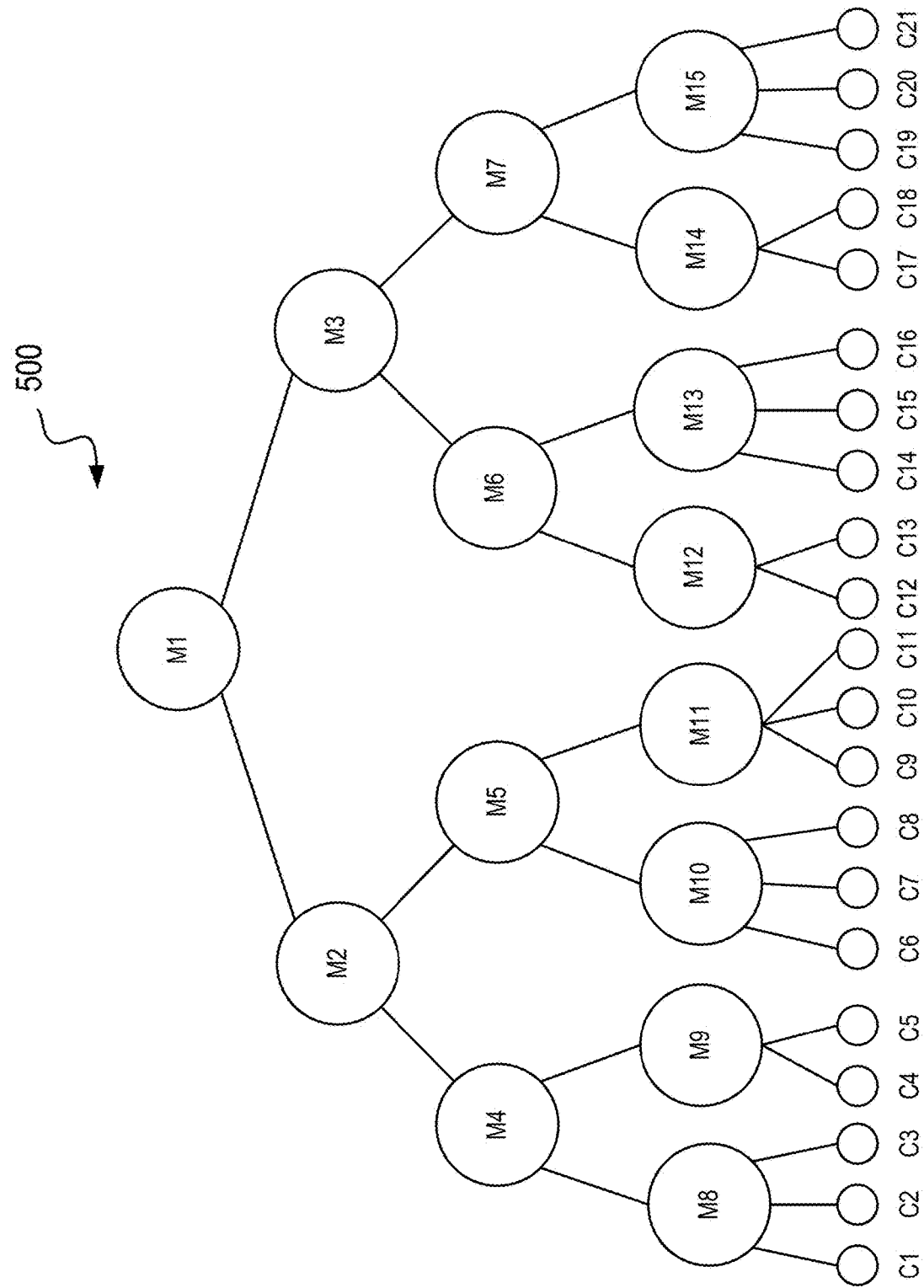
FIG. 5 illustrates an example of a hierarchical classification model including multiple classifiers at nodes of a tree structure according to certain embodiment.

FIG. 5 illustrates an example of a hierarchical classification model 500 including multiple classification models at nodes of a tree structure according to certain embodiment. In the example, hierarchical classification model 500 may be used to classify any input into one of 21 possible classes C1, C2, . . . , C20, and C21. The tree structure of hierarchical classification model 500 may include 15 nodes on four layers, where 15 classification models (M1, M2, . . . , M14, and M15) may be associated with each respective node. Classification models M1-M7, M9, M12, and M14 may be binary classification models, while classification models M8, M10, M11, M13, and M15 at the leaf nodes on the bottom layer may be multiclass classification models that are trained to class an input into one of three classes. The maximum number of classes associated with a leaf node may be fewer than a threshold number determined by the user. For example, the threshold number may be four in the example shown in FIG. 5.

The first (or top) layer of the tree structure may include one ($2^0$) root node. Classification model M1 associated with the root node may classify any input into one of two groups of classes, where a first group of classes may include, for example, classes C1-C11, and the second group of classes may include, classes C12-C21. The second layer of the tree structure may include two ($2^1$) nodes, where one node may be associated with classes C1-C11 and the other node may be associated with classes C12-C21. Classification model M2 associated with a node on the second layer may be trained to classify an input into a group of classes including classes C1-C5 and another group of classes including classes C6-C11. Similarly, classification model M3 associated with a node on the second layer may be trained to classify an input into a group of classes including classes C12-C16 and another group of classes including classes C17-C21. The third layer of the tree structure may include four ($2^2$) nodes, which may be associated with classes C1-C5, C6-C11, C12-C16, and C17-C21, respectively. Classification model M4 associated with a first node on the third layer may be trained to classify an input into a group of classes including classes C1-C3 and another group of classes including classes C4-C5. Classification model M5 associated with a second node on the third layer may be trained to classify an input into a group of classes including classes C6-C8 and another group of classes including classes C9-C11. Other classification models associated with other nodes (e.g., classification models M6 and M7) on the third layer may each be trained to classify an input into a group of classes including three classes and another group of classes including two classes. The fourth layer of the tree structure may include eight ($2^3$) leaf nodes, where the classification model associated with each leaf node may be trained to classify an input into one of two or three classes.

As shown in FIG. 5, the tree structure may include N layers (e.g., N may be 3 or more), the number of nodes on the nth layer may be $2^{n-1}$, and the total number of nodes in the tree structure may be about $2^N-1$. Thus, if the maximum number of classes a classification model at the leaf node can classify is K, the total number of classes can be classified by the hierarchical classification model is $(2^N-1) \times K$. Each input may be classified into one of the $(2^N-1) \times K$ classes after N classifications that include N−1 binary classification and one binary or multiclass classification, where the N classifications may be performed using the classification models associated with N nodes on a path from the root node to a leaf node of the tree structure.

Figure 6:
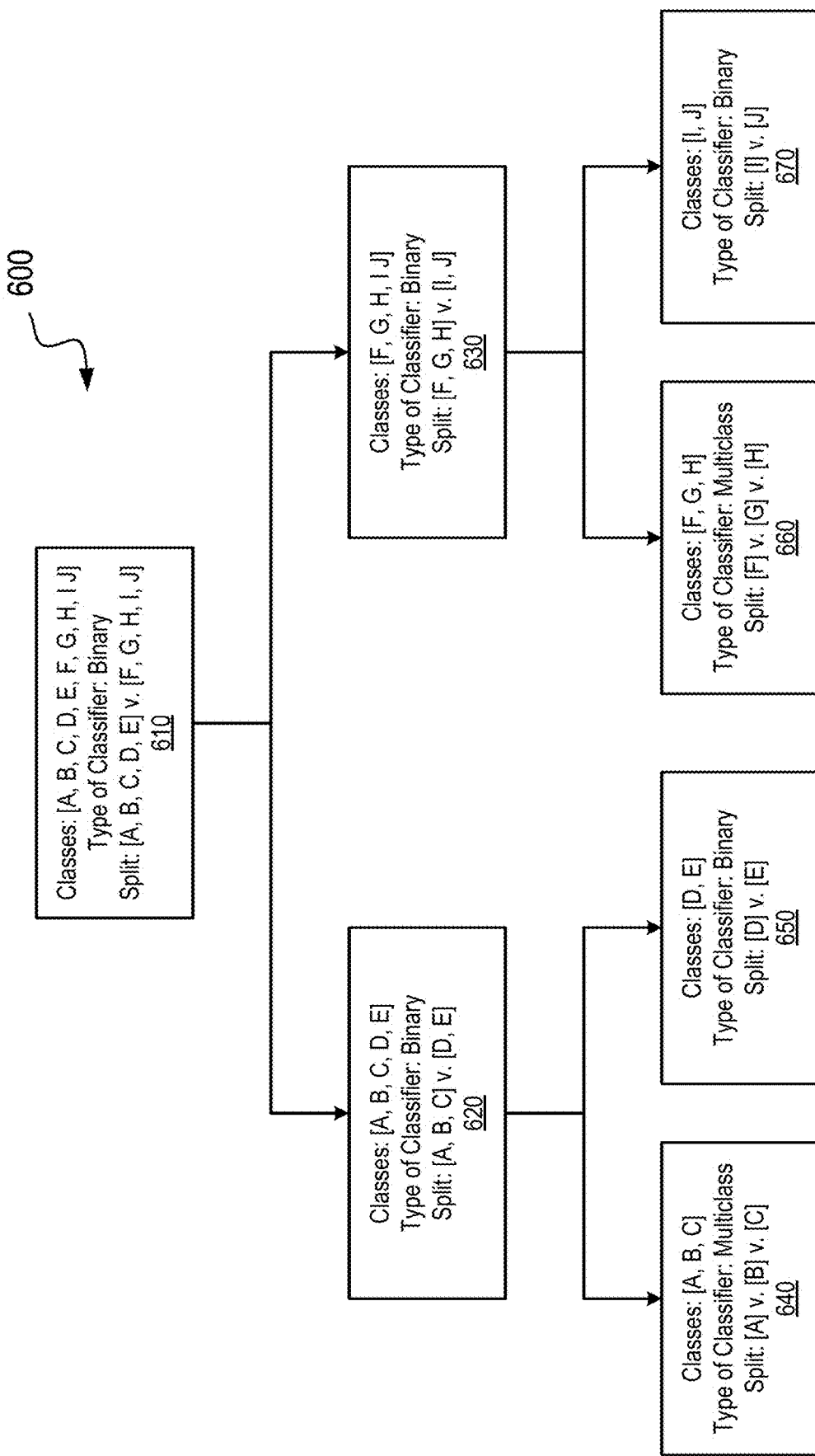
FIG. 6 depicts an example of a hierarchical classification model configured to classify inputs into ten classes according to certain embodiments.

FIG. 6 depicts an example of a hierarchical classification model 600 configured to classify input into ten classes according to certain embodiments. In some embodiments, the inputs may be user utterances during a communication session with a bot system, and the classes may be the intents of the end user when making the utterances as described above. The ten classes in the example include classes A, B, C, D, E, F, G, H, I, and J, and may be associated with a first node 610 in a tree structure representing hierarchical classification model 600. First node 610 may include a binary classification model for distinguishing inputs associated with a first set of classes from inputs associated with a second set of classes.

The first set of classes may include five classes (e.g., classes A, B, C, D, and E), and the second set of classes may include the other five classes (e.g., classes F, G, H, I, and J). In some embodiments, the classes in each set may be chosen randomly and each set may include as close to the same number of classes as possible. For example, if there are an even number of classes to be split, the first set may include the same number of classes as the second set. If there are an odd number of classes to be split, the first set may include one more class than the second set.

First node 610 may include two child nodes (e.g., a second node 620 and a third node 630). Each of the child nodes may be associated with a set of classes that are distinguished from other classes by a classification model associated with their parent node. For example, as described above, first node 610 may classify inputs into the first set and the second set of classes. The first set may be associated with second node 620, and the second set may be associated with third node 630.

Similar to first node 610 described above, each of second node 620 and third node 630 may classify inputs into two subsets of classes. For example, the first set of classes associated with second node 620 may be split into a third subset (e.g., classes A, B, and C) of classes associated with a fourth node 640 and a fourth subset (e.g., classes D and E) of classes associated with a fifth node 650, and the second set of classes associated with third node 630 may be split into a fifth subset (e.g., classes F, G, and H) of classes associated with a six node 660 and a sixth subset (e.g., classes I and J) of classes associated with a seventh node 670. As can be seen, the third subset and the fourth subset may include different numbers of classes (e.g., the third subset may include three classes and the fourth subset may include two classes), and the fifth subset and sixth subset may include different numbers of classes (i.e., the fifth subset may include three classes and the sixth subset may include two classes).

Second node 620 may include two child nodes (e.g., fourth node 640 and fifth node 650). Each of the two child nodes may be associated with a subset of classes that are distinguished from other classes by a classification model associated with second node 620. For example, as described above, the classification model associated with second node 620 may classify the inputs into the third subset of classes and the fourth subset of classes, where the third subset of classes may be associated with fourth node 640, and the fourth subset of classes may be associated with fifth node 650.

In the example depicted in FIG. 6, the tree structure of hierarchical classification model 600 may be configured to have a leaf size of fewer than a certain number, such as fewer than four. Accordingly, fourth node 640 and fifth node 650 may each be a leaf node because fourth node 640 may be associated with three different classes and fifth node 650 may be associated with two different classes. Fourth node 640 may be associated with a multiclass classification model configured to distinguish inputs belonging to three different classes (e.g., classes A, B, and C). Fifth node 650 may be associated with a binary classification model configured to distinguish inputs belonging to two different classes (e.g., classes D and E).

Third node 630 may include two child nodes (e.g., sixth node 660 and seventh node 670). Each of the two child nodes may be associated with a subset of classes that are distinguished from other classes by a classification model associated with third node 630. For example, as described above, third node 630 may classify inputs into the fifth subset of classes and the sixth subset of classes. The fifth subset of classes may be associated with sixth node 660, and the seventh subset of classes may be associated with seventh node 670.

As described above, the tree structure of hierarchical classification model 600 may be configured to have a leaf size of fewer than four. Accordingly, sixth node 660 and seventh node 670 may each be a leaf node because sixth node 660 may be associated with three different classes and seventh node 670 may be associated with two different classes. Sixth node 660 may be associated with a multiclass classification model configured to classify input into the three different classes (e.g., classes F, G, and H). Seventh node 670 may be associated with a binary classification model configured to classify inputs into two different classes (e.g., classes I and J).

One advantage of the hierarchy classification model is that training a binary classification model at each level is fast and the memory usage may be relatively low. At leaf nodes, a multiclass classification model may sometimes be used. Using a multiclass classification model allows reducing the depth of the tree structure for reduced training time and classification time. Further, training at each level or each node can happen separately in different systems, allowing for distributed training and classification.

Figure 7:
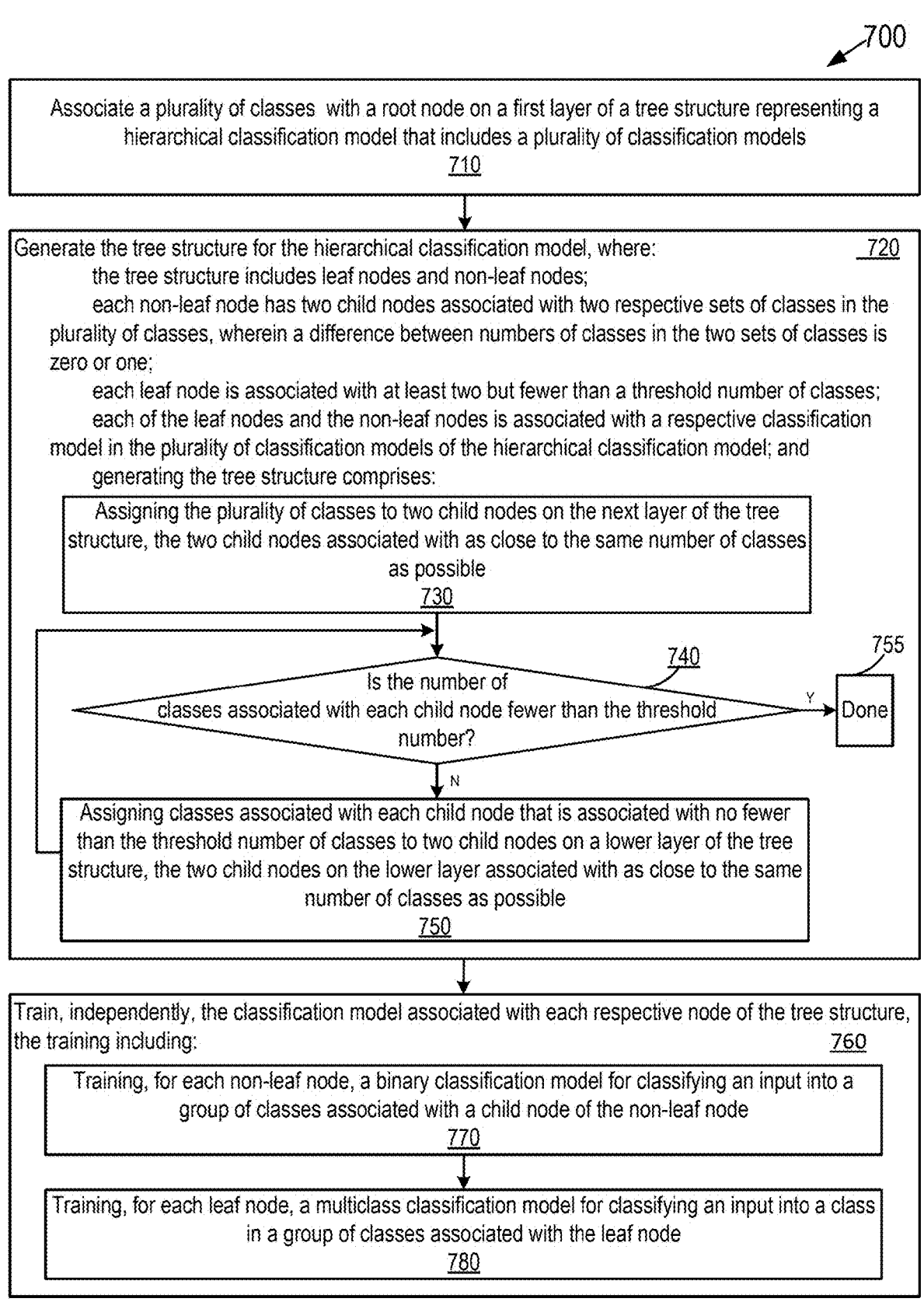
FIG. 7 is a simplified flowchart depicting an example of processing for generating a hierarchical classification model according to certain embodiments.

FIG. 7 is a simplified flowchart 700 depicting an example of processing for generating a hierarchical classification model according to certain embodiments. The hierarchical classification model may include a plurality of classification models arranged according to a tree structure. The processing depicted in FIG. 7 may be implemented in software (e.g., code, instructions, or program) executed by one or more processing units (e.g., processors or cores) of one or more systems, hardware, or combinations thereof. The software may be stored on a non-transitory storage medium (e.g., on a memory device). The method depicted in FIG. 7 and described below is intended to be illustrative and non-limiting. Although FIG. 7 may depict the various processing occurring in a particular sequence or order, this is not intended to be limiting. In certain embodiments, the processing may be performed in some different order or some operations may also be performed in parallel. In some embodiments, the processing may include additional operations, and some operations may be split or merged.

In the embodiment depicted in FIG. 7, the processing may start after a plurality of classes are identified. The plurality of classes may be received by a computer system from a user. For example, a user may request a hierarchical classification model to be generated to classify any input into one of the plurality of classes. In one example, a user may request a bot system to be generated, where each class of the plurality of classes may be associated with a particular user intent to be determined based on a user utterance, as described above with respect to FIG. 1.

At 710, a computer system may associate a plurality of classes to be classified by the hierarchical classification model with a root node on a first layer (e.g., the top layer) of a tree structure representing the hierarchical classification model that may include a plurality of classification models. The computer system may include a distributed system, a cloud-based system, or any other computer system. As described above, the plurality of classes may include, for example, more than 10, more than 50, more than 100, or more classes. The plurality of classes may be identified by a user based on the user's specific application, such as user intents during a conversation with a bot system. In some embodiments, the user may also specify certain parameters of the hierarchical classification model or the tree structure representing the hierarchical classification model, such as the maximum number of classes each classification model for a respective leaf node of the tree structure can classify, the maximum number of layers of the tree structure, the maximum number of child nodes each non-leaf node may have, the types of classification model to use, etc.

At 720, the computer system may generate the tree structure for the hierarchical classification model based on the plurality of classes, where the tree structure may include leaf nodes and non-leaf nodes, and each node in the tree structure except the leaf nodes may have two child nodes. The two childe nodes may correspond to two respective sets of classes, where the two set of classes may include as close to the same number of classes as possible. For example, if there are an even number of classes in the plurality of classes, the first set of classes may include the same number of classes as the second set of classes. If there are an odd number of classes in the plurality of classes, the first set of classes may include one more class than the second set of classes. Each leaf node of the tree structure may include a classification model configured to distinguish fewer than a threshold number of classes, such as fewer than 10, fewer than 6, or fewer than 4. As described above, the threshold number may be specified by a user. In some embodiments, the threshold number may be determined based on the total number of classes to be classified and the maximum depth of the tree structure specified by the user. The tree structure may be generated by recursively dividing the classes associated with a non-leaf node approximately equally into two sets of classes and assigning each set of classes to one of two child nodes of the non-leaf node, as described below with respect to 730-750.

At 730, the computer system may assign the plurality of classes to two child nodes on the next layer (e.g., the second layer) of the hierarchical tree structure, where the two child nodes may be associated with as close to the same number of classes as possible (with a difference being zero or one) as described above. In some embodiments, the computer system may randomly select the classes to be assigned to each child node. In some embodiments, the computer system may intelligently select the classes to be assigned to each child node. For example, the computer system may select the classes based on some features or characteristics of the classes, such as common features or differences (distances) between features of the classes in a feature space.

At 740, for each child node on the next layer, the computer system may determine whether the number of classes associated with the child node on the next layer is fewer than a threshold number. As described above, the threshold number may be specified by the user or may be determined otherwise, such as based on the desired depth of the tree structure. The threshold number may be determined based on the complexity of training a classification model to distinguish inputs associated with multiple classes. In some embodiments, the threshold number may be an even number, such as 10, 8, 6, or 4. In some embodiments, the threshold number may be an odd number, such as 11, 9, 7, or 5. In some embodiments, the threshold number may be selected such that each class can be classified using a same number of classification models or going through a same number of nodes.

At 750, if the number of classes associated with a child node on the next layer is not fewer than the threshold number, the computer system may approximately equally assign the classes associated with the child node on the next layer to two child nodes on a lower layer in the hierarchical tree structure, such that the two child nodes on the lower layer may be associated with as close to the same number of classes as possible (e.g., with a difference of zero or one class). The computer system may perform processing at 740 and 750 recursively until the number of classes associated with each respective node on a layer is fewer than the threshold number.

At 755, if each child node on a layer of the tree structure is associated with fewer than the threshold number of classes, the tree structure may be completed, where the layer on which each node is associated with fewer than the threshold number of classes is the leaf layer, and each node on the leaf layer is a leaf node.

At 760, the computer system may independently train the classification model associated with each respective node of the hierarchical tree structure. The training of the classification models associated with all nodes of the tree structure can be performed in parallel or in series. In some embodiments, the training of the classification models associated with all nodes of the tree structure can be performed by a same computer or server. In some embodiments, the training of the classification models associated with all nodes of the tree structure can be performed on different computers or servers in a distributed computer system or a cloud-based computer system. The training may include training a binary classification models for each non-leaf node at 770 and training a multiclass classification model for each leaf node at 780.

At 770, the compute system may train, for each non-leaf node, a binary classification model for classifying an input into a group of classes associated with a child node of the non-leaf node. The binary classification model may include, for example, a linear classifier (e.g., a logistic regression or naive Bayes classifier), a support vector machine (SVM) classifier, a decision tree classifier, a nearest neighbor classifier, or a neural network classifier. The binary classification model may be configured to distinguish inputs associated with two sets of classes that include approximately equal numbers of classes (e.g., with a difference of zero or one).

In one embodiment, a binary classification model (e.g., a SVM classifier) may find a line that separates two sets of input data points. For example, given a data vector with each data point in the data vector mapped to one of two classes, the binary classification model may learn to map the data points provided into a two-dimensional space, and find a line that maximally separates the two classes (i.e., a line that can maximize the minimum distance between the data points and the line). To enable a quick classification, a second function called a kernel trick may be applied. The kernel trick may convert the vectorized data points into a new high dimensional space, where the classification can be done using linear models. There are different kernel tricks available, for example, a linear function, a Radial Basis Function, and a polynomial function. Once the kernel trick is applied, the kernel can classify data points associated with the two classes using a linear function. The process of finding the maximal separation in the new space may involve searching for a parameter "C" that defines how well the points can be classified. For lower C values, the classifier model may have higher margins of separation.

At 780, the compute system may train, for each leaf node, a multiclass classification model for classifying an input into an individual class in the group of classes associated with the leaf node. The multiclass classification model may include, for example, a multiclass SVM classifier, a K-nearest neighbors classifier, a neural network classifier, etc. The multiclass classification model may be configured to distinguish between two or more classes.

In some embodiments, a multiclass classification model may be an extension of a binary classification model. For example, the multiclass classification model may perform (1) one-vs-one classifications or (2) one-vs-all classifications. In one embodiment, a tool referred to as MITIE may be used and modified to build SVM classifiers for a bot system. See, e.g., "MITIE: MIT Information Extraction" (available at https://github.com/mit-nlp/MITIE). The MITIE tool may be modified to perform feature vector extraction, random split of user utterances (e.g., based on a 80:20 split), searches for best values for "C", training on, for example, 80% of the utterances, and testing on, for example, 20% of the utterances.

In some embodiments, a LibSVM library may be used for building SVM classification models and multiclass classification models. See, e.g., Chang et al., "LIBSVM—A Library for Support Vector Machines" (available at https://www.csie.ntu.edu.tw/~cjlin/libsvm/). The LibSVM may include a format of: <label><index1>:<value1><index2>: <value2>.... Each line in LibSVM may include an instance and is ended by '\n' character. For classification, <label> may include an integer indicating the class label.

In some embodiments, an MLlib library may be used for generating the hierarchical classification model. See, e.g., "Linear Methods—RDD-based API" (available at https:// spark.apache.org/docs/latest/mllib-linear-methods.html). MLlib is a machine learning library provided by Spark and supports linear SVM classification. However, MLlib only supports binary classification. Therefore, one v. Rest strategy can be used for multiclass classification, which means, for each multiclass classification model, a binary classification model for each class must be used.

In some embodiments, a LibLinear library may be used for generating the hierarchical classification model. See, e.g., Machine Learning Group at National Taiwan University, "LIBLINEAR—A Library for Large Linear Classification" (available at https://www.csie.ntu.edu.tw/~cjlin/liblinear/). LibLinear is a library for large linear classification. It is specifically optimized for data with a huge number of features and for cases where linear mapping and non-linear mapping have similar performances. A computer system may quickly train a much larger set with a linear classifier, and the training time can be reduced significantly while accuracy remains similar.

The hierarchical classification model may be generated by associating each node in the tree structure with its corresponding trained classification model. The hierarchical classification model may then be used to classify any input into one of the plurality of classes by going through a path from the root node to a leaf node of the tree structure. For example, the hierarchical classification model may be used in a bot system (e.g., more specifically, the intent determination subsystem 154 of bot system 120) to determine user intents based on the utterances of the end user. When a bot system receives an user utterance, a natural language processor (e.g., natural language processor 152) may parse the user utterance, and the intent determination subsystem (e.g., intent determination subsystem 154) may then determine the user intent by querying the hierarchical classification model using the parsed user utterance.

The hierarchical classification model may be updated by independently retraining or otherwise updating a classification model associated with any node of the tree structure, without the need to retrain or update other classification models associated with other nodes of the tree structure. For example, in some embodiments, a classification model may be retrained using new training samples, without the need to retrain other classification models. In some embodiments, a classification model may be replaced with a new classification model that is a different type of classification model, and the new classification model may be trained using training samples used to train the original classification model. In some embodiments, some classification models may be retrained or otherwise updated concurrently and independently. For example, when additional training data associated with a particular class is available, such as through feedback from end users regarding previous classification results using the hierarchical classification model, classification models for all or some nodes associated with the particular class may be retrained using the additional training data. In some embodiments, a new class may be added to the plurality of classes and associated with a set of nodes (e.g., one node on each layer), and only the set of nodes associated with the new class may be retrained and updated.

Figure 8:
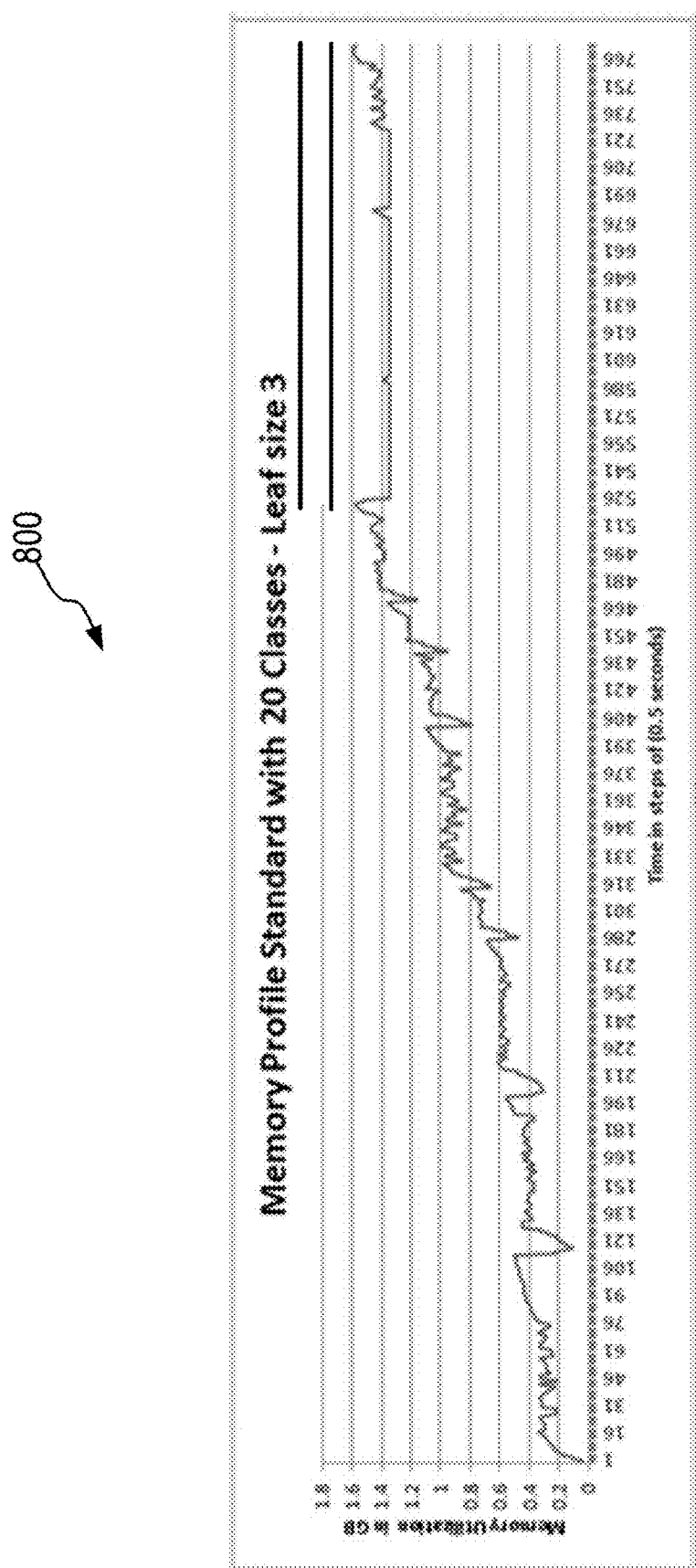
FIG. 8 illustrates an example graph depicting the memory utilization over time for training a hierarchical classification model to classify inputs into 20 classes where the maximum number of classes associated with the leaf nodes is three, according to certain embodiments.

FIG. 8 illustrates an example graph 800 depicting the memory utilization over time for training a hierarchical classification model (e.g., including multiple binary SVM models) configured to classify inputs into 20 classes when the maximum number of classes associated with the leaf nodes is three, according to certain embodiments. As illustrated, the training can be completed in about 380 seconds and may use about 1.6 GB of memory space. In contrast, as shown in FIG. 4 described above, a multiclass SVM model for distinguishing inputs associated with 15 classes may not be successfully trained using more memory space.

Figure 9:
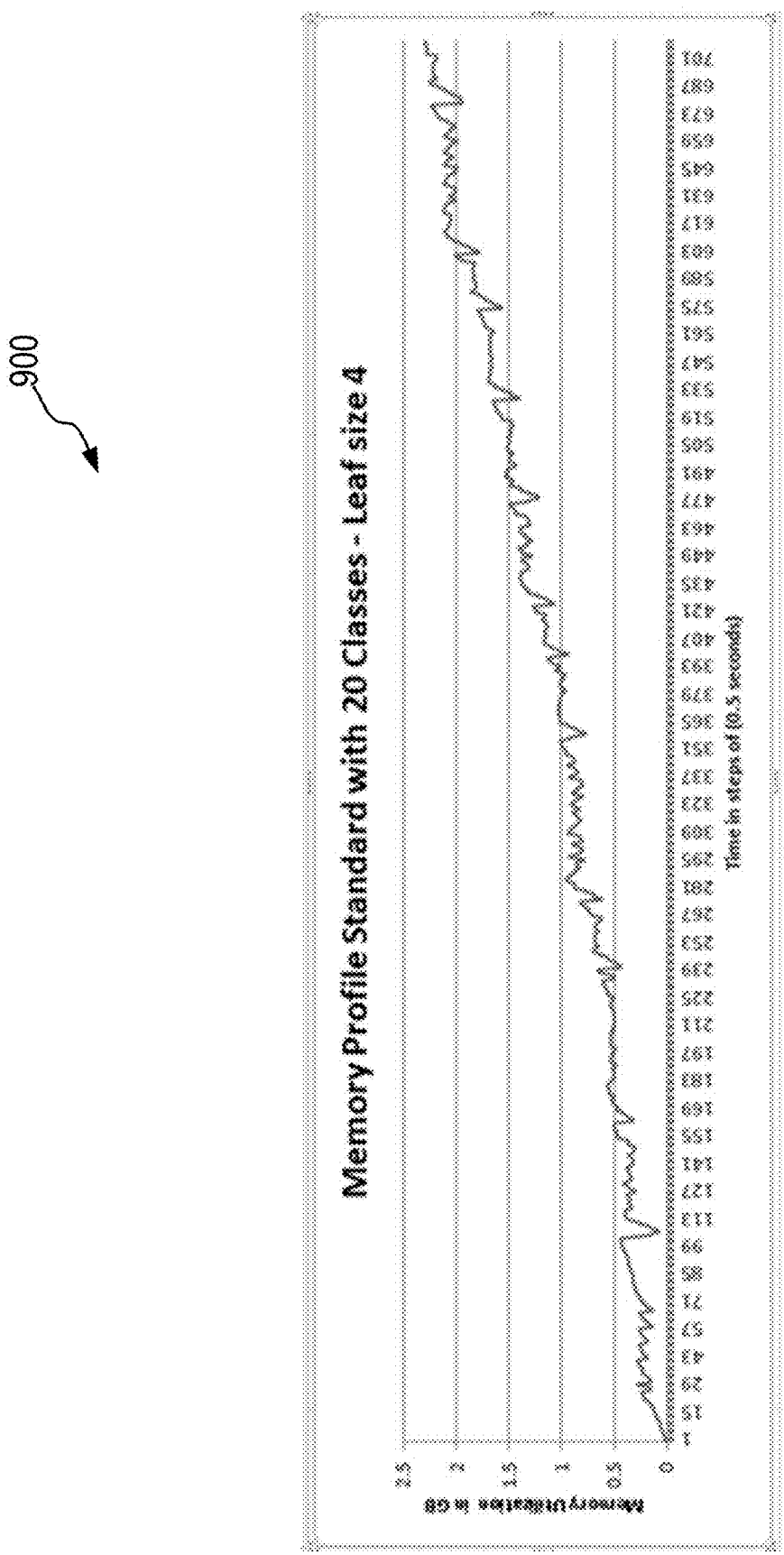
FIG. 9 illustrates an example graph depicting the memory utilization over time for training a hierarchical classification model to classify inputs into 20 classes where the maximum number of classes associated with the leaf nodes is four, according to certain embodiments.

FIG. 9 illustrates an example graph 900 depicting the memory utilization over time for training a hierarchical classification model (e.g., including multiple binary SVM models) configured to classify inputs into 20 classes when the maximum number of classes associated with the leaf nodes is four, according to certain embodiments. As illustrated, the training can be completed in about 350 seconds and may use about 2.5 GB of memory space. As compared with the example shown in FIG. 8, the training time in the example shown in FIG. 9 may be reduced, but the memory usage may be increased.

Figure 10:
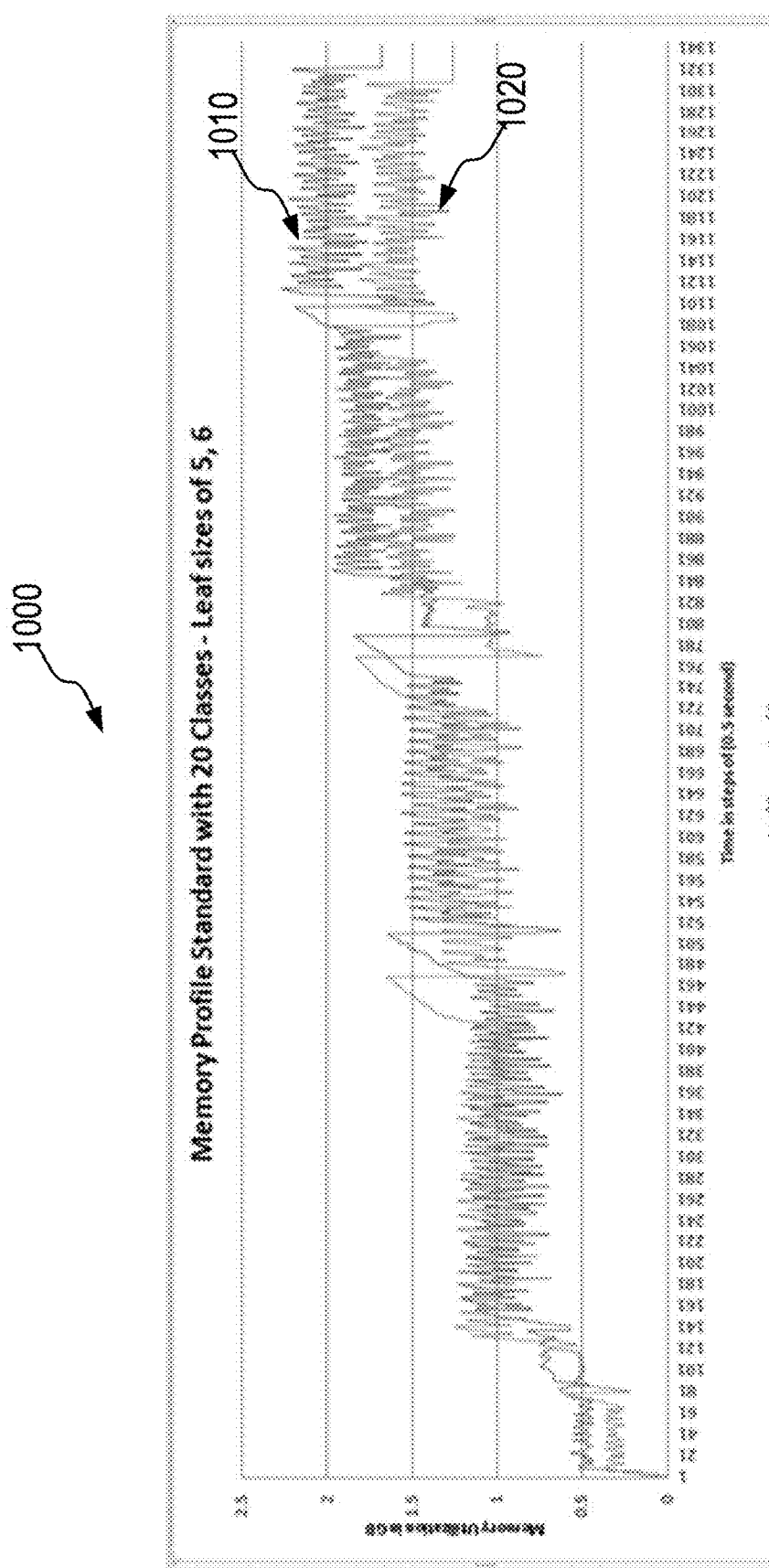
FIG. 10 illustrates an example graph depicting the memory utilization over time for training a hierarchical classification model to classify inputs into 20 classes where the maximum number of classes associated with the leaf nodes is five or six, according to certain embodiments.

FIG. 10 illustrates an example graph 1000 depicting the memory utilization over time for training a hierarchical classification model (e.g., including multiple binary SVM models) configured to classify inputs into 20 classes when the maximum number of classes associated with the leaf nodes is five (shown by a curve 1010) or six (shown by a curve 1020), according to certain embodiments. The training may be successful at the end. However, the training time may be much longer than the examples shown in FIGS. 8 and 9, and the memory usage may be higher than the example shown in FIG. 8.

Figure 11:
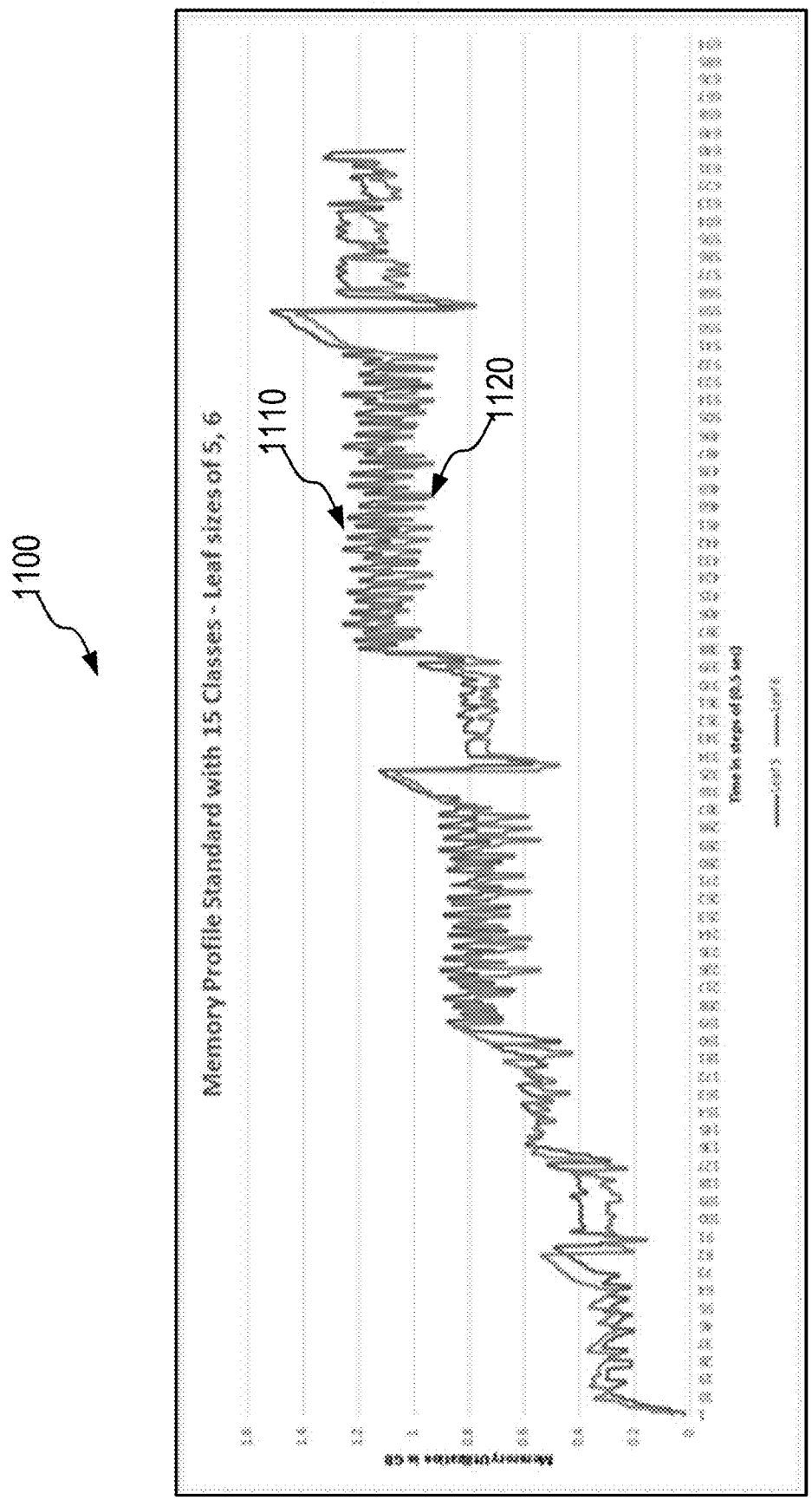
FIG. 11 illustrates an example graph depicting the memory utilization over time for training a hierarchical classification model to classify inputs into 15 classes where the maximum number of classes associated with the leaf nodes is five or six, according to certain embodiments.

FIG. 11 illustrates an example graph 1100 depicting the memory utilization over time for training a hierarchical classification model (e.g., including multiple binary SVM models) configured to classify inputs into 15 classes when the maximum number of classes associated with the leaf nodes is five (shown by a curve 1110) or six (shown by a curve 1120), according to certain embodiments. The training may be successful in about 320 seconds using about 1.5 GB of memory space. In contrast, as shown in FIG. 4 above, a multiclass SVM model with 15 classes may not be successfully trained using more memory space (e.g., 3.5 GB) after a longer time (e.g., about 1600 seconds).

FIG. 12 illustrates an example of code for creating a hierarchical classification model according to certain embodiments. FIGS. 13A and 13B illustrate an example of pseudo code for training a hierarchical classification model according to certain embodiments. In the examples, MITIE tool as described above is used to build the hierarchical classification model for a bot system. The MITIE tool may perform feature vector extraction, split of training samples, searches for best values for "C", training using a portion of the training samples according to the split, and testing using the rest of the training samples.

When querying a hierarchical classification model described above, an input may be sent to the hierarchical classification model to identify a most likely class for the input. A first classification model associated with the root node of a tree structure representing the hierarchical classification model may be queried with the input. A result of the query of the first classification model may include a first value and/or a second value. The first value may indicate a likelihood that the input is associated with a class in a first set of classes associated with a first child node of the root node. The second value may indicate a likelihood that the input is associated with a class included in a second set of classes associated with a second child node of the root node. Based upon the result of the query of the first classification model, a child node of the root node may be queried next with the input. In some embodiments, the child node queried next may be the one associated with the higher value of the first value and the second value. In some embodiments, the child node queried next may be the one associated with a value greater than a threshold value, such as a value indicating a likelihood greater than, for example, about 70%. The child node associated with the lower value or a value below the threshold value may be skipped, thereby reducing the total number of classification models used for classifying the input.

Figure 14:
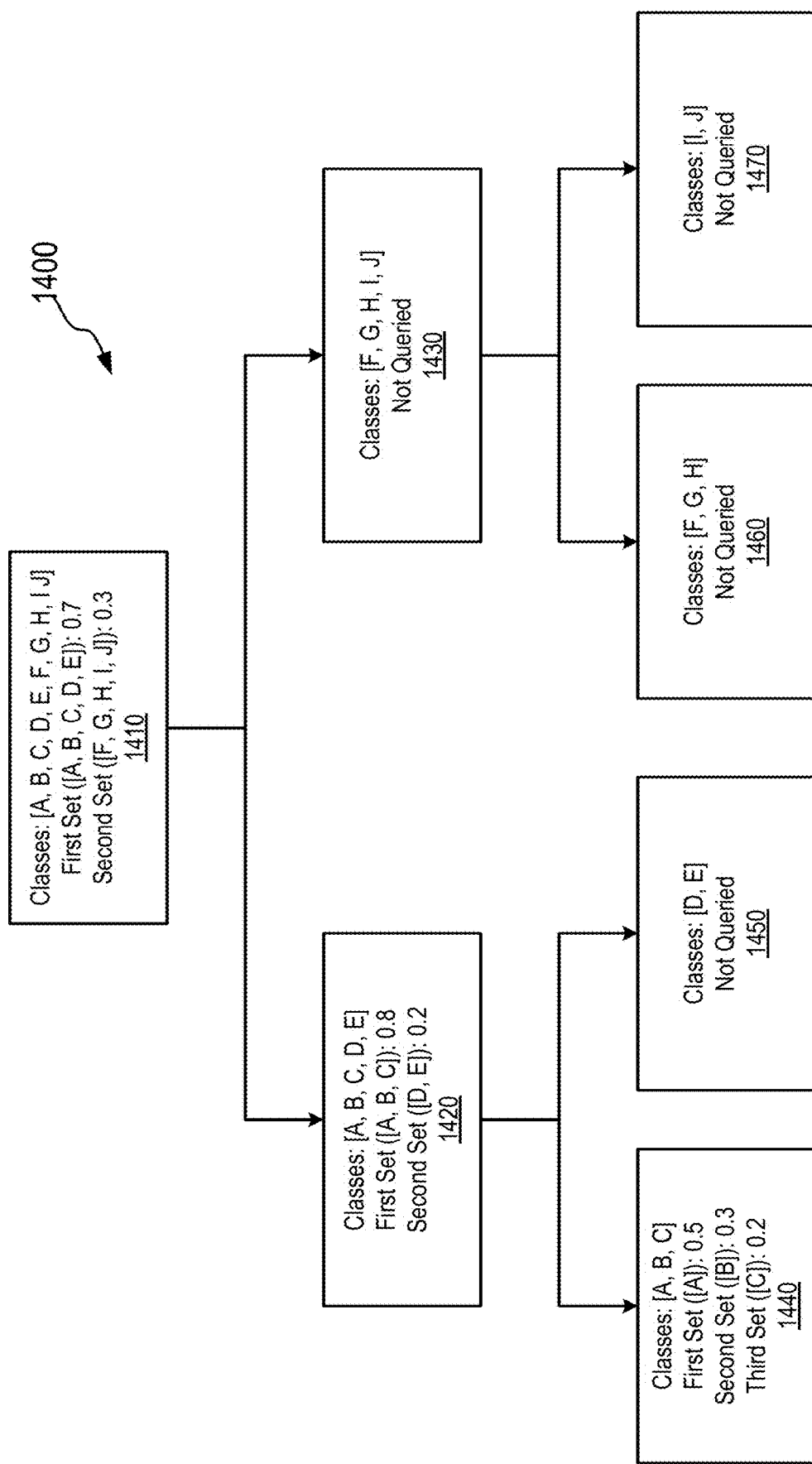
FIG. 14 depicts querying an example of a hierarchical classification model according to certain embodiments.

FIG. 14 depicts an example of querying a hierarchical classification model 1400, such as hierarchical classification model 600 shown in FIG. 6, according to certain embodiments. The input (e.g., a parsed user utterance) may be received by hierarchical classification model 1400 in order to determine a most likely class for the input. A first classification model (e.g., a binary classification model) associated with a root node (e.g., first node 1410) of hierarchical classification model 1400 may be queried with input first. The first classification model may distinguish inputs associated with a first set of classes (e.g., classes A, B, C, D, and E) from inputs associated with a second set of classes (e.g., classes F, G, H, I, and J). The first classification model may output a result that includes a first value and a second value. In the example, the first value, which may be associated with the first set of classes (e.g., classes A, B, C, D, and E), may be 0.7. The second value, which may be associated with the second set of classes (e.g., classes F, G, H, I, and J), may be 0.3.

Because the first value is greater than the second value, hierarchical classification model 1400 may determine that the input is most likely associated with the first set of classes, and thus a second node 1420 (rather than a third node 1430) may be queried next. Second node 1420 may be associated with a second classification model (e.g., a binary classification model). The second classification model may be queried with the input. The second classification model may have been trained to distinguish between inputs associated with a first set of classes (e.g., classes A, B, and C) and inputs associated with a second set of classes (e.g., classes D and E). The second classification model may output a result that includes a first value and a second value. In the example shown in FIG. 14, the first value, which may be associated with the first set of classes (e.g., classes A, B, and C), may be 0.8. The second value, which may be associated with the second set of classes (e.g., classes D and E), may be 0.2.

Because, at second node 1420, the first value is greater than the second value, hierarchical classification model 1400 may determine that the input is most likely associated with the first set of classes (e.g., classes A, B, and C), and thus a fourth node 1440 (rather than a fifth node 1450) may be queried next. Fourth node 1440 may be associated with a third classification model (e.g., a multiclass classification model). The third classification model may be queried with the input. The third classification model may have been trained to distinguish between inputs associated with a first class (e.g., class A), a second class (e.g., class B), and a third class (e.g., class C). The third classification model may output a result that includes a first value, a second value, and a third value. In the example shown in FIG. 14, the first value, which may be associated with the first class (e.g., class A), may be 0.5. The second value, which may be associated with the second class (e.g., class B), may be 0.3. The third value, which may be associated with the third class (e.g., class C), may be 0.2.

Because the first value is greater than the second value and the third value, the first class (e.g., class A) may be identified as the most likely class for the input. Thus, only one path from the root node (e.g., first node 1410) to a leaf node (e.g., fourth node 1440) may be traversed during the query. Classification models associated with nodes on other paths, such as third node 1430, fifth node 1450, a sixth node 1460, and a seventh node 1470 in the example, may not be queried.

In some embodiments, a score of the most likely class may be determined as a sum of all output values associated with the class from classification models that are queried in order to identify the class. For example, for class A depicted in FIG. 14, the score may be 2 (i.e., 0.7+0.8+0.5). The score for classes on other paths may not need to be calculated. This is different from a multiclass classifier, such as a neural network that includes a fully connected layer at the output, where the scores (e.g., probabilities) for all possible classes are calculated before identifying the most likely class using, for example, a Softmax function.

In some embodiments, a score for any class in the hierarchical classification model can also be determined as a sum of all output values from models that are associated with the class and are queried in order to identify the most likely class. For example, in the example shown in FIG. 14, scores for other classes, such as B, D, and J, may be 1.8 (i.e., 0.7+0.8+0.3), 0.9 (i.e., 0.7+0.2), and 0.3 respectively. However, no additional classification may be performed using the classification models associated with nodes on other paths in order to determine these scores.

In addition, as shown by the example depicted in FIG. 14, the path to identify any specific class may include a similar number of nodes (and thus may involve a similar number of classification models). Therefore, the time used to query the hierarchical classification model with any input may be similar and predictable. Furthermore, the number of classification models used to identify a particular class from N possible classes may be fewer than $\log_2 N$. Thus, the query time can be short. As such, the hierarchical classification model may be suitable for real-time applications, such as live chat.

Figure 15:
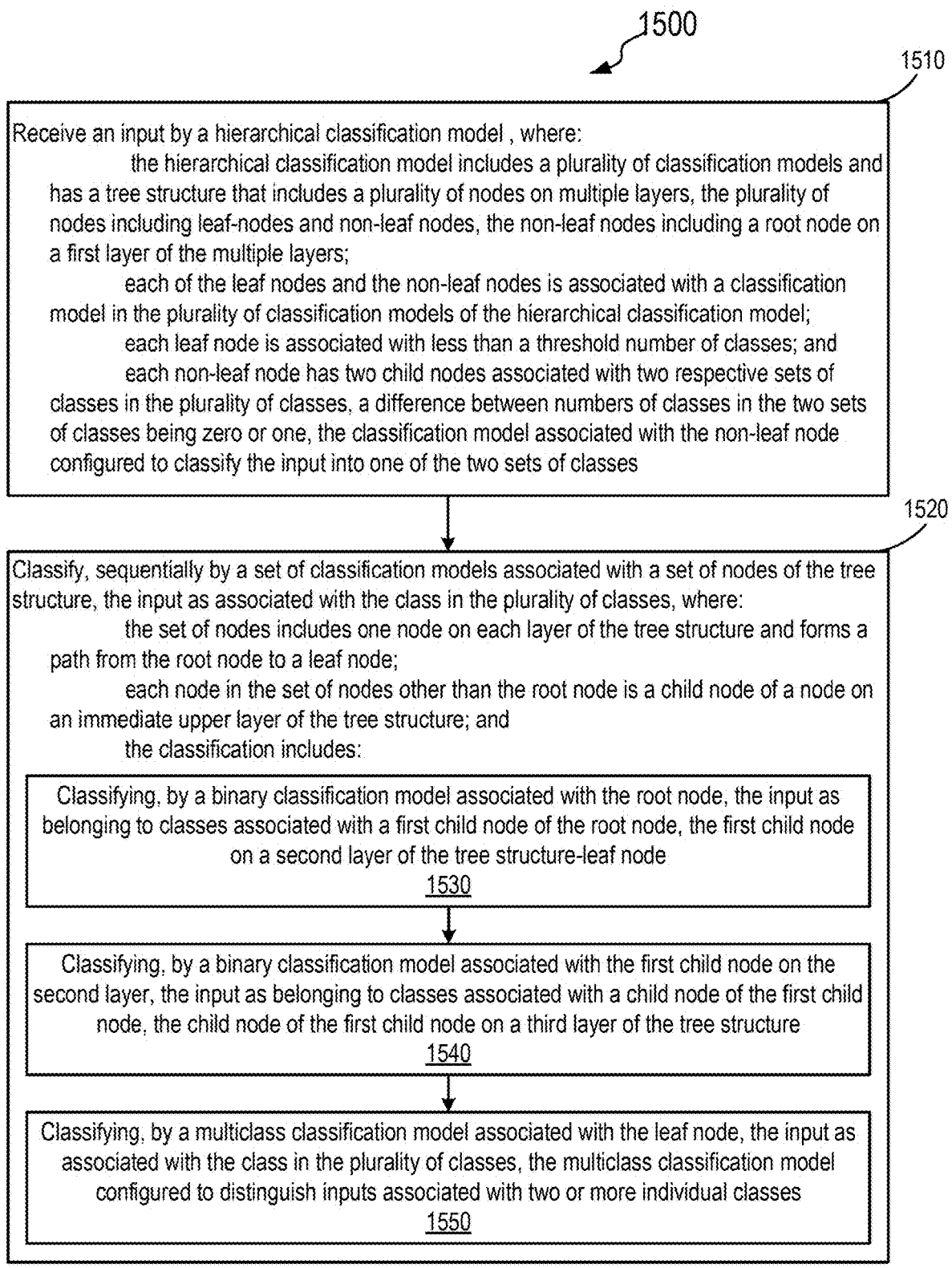
FIG. 15 is a simplified flowchart depicting an example of processing for associating an input with a class among a plurality of classes by querying a hierarchical classification model according to certain embodiments.

FIG. 15 is a simplified flowchart 1500 depicting an example of processing for associating an input with a class in a plurality of classes by querying a hierarchical classification model according to certain embodiments. The processing depicted in FIG. 15 may be implemented in software (e.g., code, instructions, or program) executed by one or more processing units (e.g., processors or cores) of one or more systems, hardware, or combinations thereof. The software may be stored on a non-transitory storage medium (e.g., on a memory device). For example, the hierarchical classification model may be implemented using one or more processors and one or more memory devices on one or more computers or servers. The method depicted in FIG. 15 and described below is intended to be illustrative and non-limiting. Although FIG. 15 depicts the various processing steps occurring in a particular sequence or order, this is not intended to be limiting. In certain embodiments, the steps may be performed in some different order or some steps may also be performed in parallel. In some embodiments, the processing may include additional operations, and some operations may be split or merged.

In the embodiment depicted in FIG. 15, the processing may start at 1510 when a query is received by a hierarchical classification model. The query may include a request to classify an input, such as a user utterance or message during a live chat with a bot system as described above with respect to FIG. 1. The hierarchical classification model may be configured to distinguish inputs associated with a plurality of classes, such as different user intents. In some embodiments, the user utterance or message may be parsed, for example, by natural language processor 152, and sent to the hierarchical classification model as the input to be classified. The bot system may respond to the user utterance or message based upon an identification of a class associated with the input by the hierarchical classification model.

The hierarchical classification model may include any hierarchical classification model disclosed herein, such as described above with respect to, for example, FIGS. 4-7 and 14. The hierarchical classification model may include a plurality of classification models and has a tree structure that includes a plurality of nodes on multiple layers. The plurality of nodes may include leaf-nodes and non-leaf nodes, where the non-leaf nodes may include a root node on a first (i.e., top) layer of the tree structure. Each of the leaf nodes and non-leaf nodes may be associated with a classification model in the plurality of classification models of the hierarchical classification model. Each leaf node may be associated with at least two but fewer than a threshold number of classes, such as fewer than 6 or fewer than 4. Each non-leaf node may have two child nodes that correspond to two respective sets of classes in the plurality of classes, where a difference between numbers of classes in the two sets of classes may be fewer than two, such as zero or one. The classification model associated with each non-leaf node may be configured to classify an input into one of the two sets of classes. The tree structure may include two or more layers of nodes. In some embodiments, the hierarchical classification model may be configured to classify an input into one of multiple classes, such as, 20 or more classes, 50 or more classes, 100 or more classes, or 1000 or more classes. In some embodiments, the number of layers of the tree structure may be fewer than a threshold number, such as fewer than 10, fewer than 8, or fewer than 5. In some embodiments, every path of the tree structure from the root node to a leaf node may include a same number of nodes (i.e., having the same height or depth). In some embodiments, all leaf nodes may be on a same layer (e.g., the bottom layer) of the tree structure.

At 1520, a set of classification models associated with a set of nodes of the tree structure may sequentially classify the input as associated with the class in the plurality of classes. The set of nodes may include one node on each layer of the tree structure and may form a path from the root node to a leaf node, where each node in the set of nodes other than the root node may be a child node of a node on an immediate upper layer of the tree structure. In some embodiments, classifying the input may include classifying, by a binary classification model associated with the root node, the input as belonging to classes associated with a first child node of the root node, where the first child node may be on a second layer of the tree structure. In some embodiments, classifying the input may further include classifying, by a binary classification model associated with the first child node on the second layer, the input as belonging to classes associated with a child node of the first child node, where the child node of the first child node may be on a third layer of the tree structure. The binary classification model may include a support vector machine (SVM) classifier, a logistic regression classifier, a naive Bayes classifier, a decision tree classifier, a nearest neighbor classifier, or a neural network classifier.

In some embodiments, classifying the input using a binary classification model associated with a node may include determining, by the binary classification model, a first value indicating a likelihood that the input belongs to classes associated with a first child node of the node, and a second value indicating a likelihood that the input belongs to classes associated with a second child node of the node, and then classifying the input as belonging to classes associated with the first child node of the node based on determining that the first value is greater than the second value or based on determining that the first value is greater than a threshold value.

For example, as described above with respect to FIG. 14, the first classification model associated with the root node (e.g., first node 1410) of hierarchical classification model 1400 may be queried with the input first. The first classification model may distinguish between inputs associated with a first set of classes (e.g., classes A, B, C, D, and E) and inputs associated with a second set of classes (e.g., classes F, G, H, I, and J). The first classification model may output a result that includes a first value (e.g., 0.7) associated with the first set of classes (e.g., classes A, B, C, D, and E) and a second value (e.g., 0.3) associated with the second set of classes (e.g., classes F, G, H, I, and J). Because the first value is greater than the second value, hierarchical classification model 1400 may determine that the input is most likely associated with the first set of classes associated with second node 1420 (rather than third node 1430). As such, second node 1420 may be queried next.

As another example, at second node 1420, a second classification model associated with second node 1420 may have been trained to distinguish between inputs associated with a first set of classes (e.g., classes A, B, and C) and inputs associated with a second set of classes (e.g., classes D and E). The second classification model may output a result that includes a first value (e.g., 0.8) associated with the first set of classes (e.g., classes A, B, and C) and a second value (e.g., 0.2) associated with the second set of classes (e.g., classes D and E). Because, at second node 1420, the first value is greater than the second value, the hierarchical classification model 1400 may determine that the input is most likely associated with the first set of classes (e.g., classes A, B, and C) that are associated with fourth node 1440, and thus fourth node 1440 (rather than a fifth node 1450) may be queried next.

In some embodiments, classifying the input as associated with the class in the plurality of classes may include classifying, by a multiclass classification model associated with the leaf node in the set of nodes, the input as associated with the class in the plurality of classes. The multiclass classification model may be configured to classify inputs into two or more individual classes, such as 2, 3, 4, 5, or more classes. The multiclass classification model may include, for example, a multiclass support vector machine (SVM) classifier, a K-nearest neighbors classifier, or a neural network classifier.

In some embodiments, after the class is identified at the leaf node, information regarding the class may be sent to a subsystem of a bot system, such as action engine 160, which may determine how to respond to the user utterance or message received by the bot system based upon the identification of the class and a state machine as described above.

For example, the class may include one or more predefined responses that can be used when the class is identified as described above.

Figure 16:
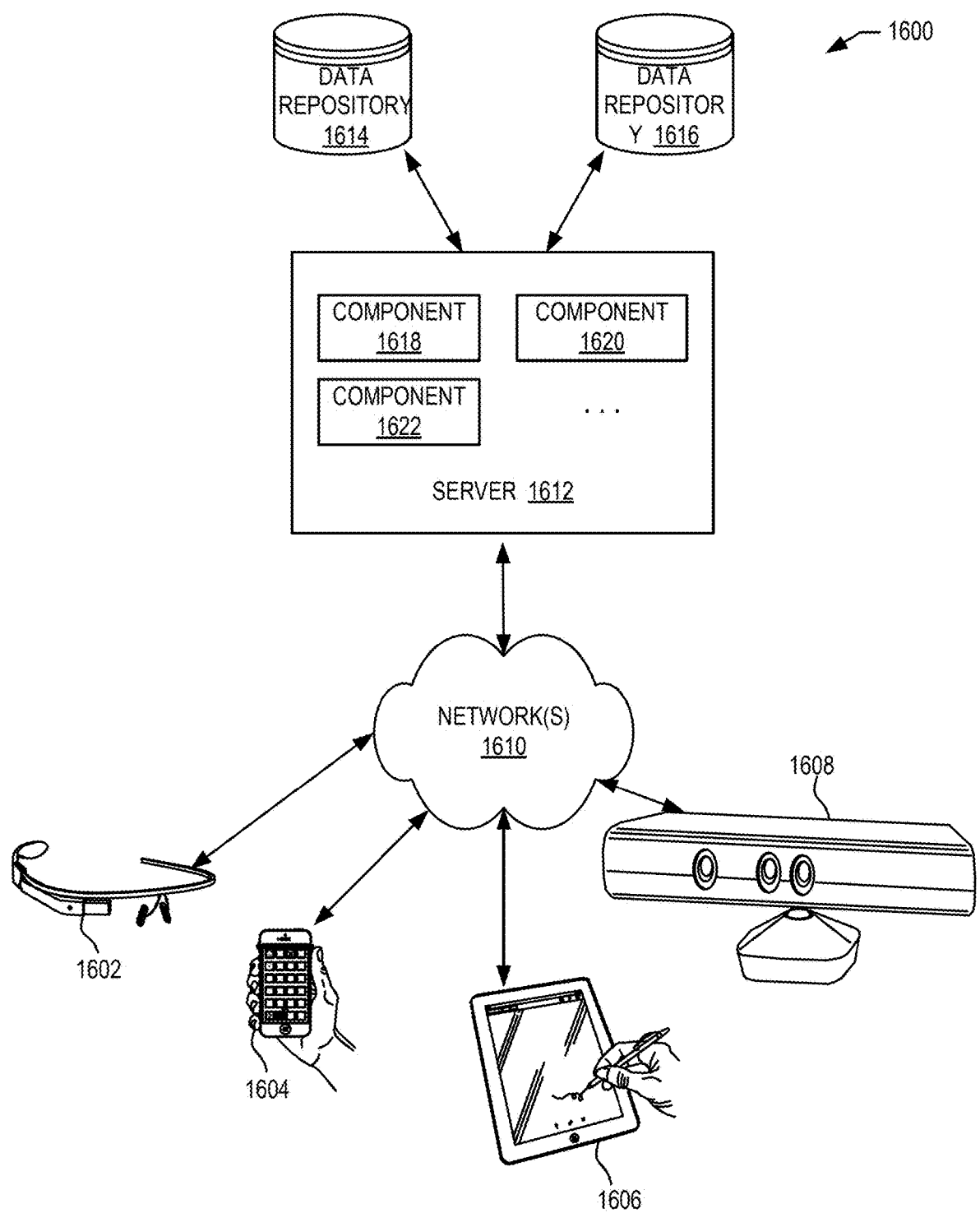
FIG. 16 depicts a simplified diagram of a distributed system for implementing some embodiments.

FIG. 16 depicts a simplified diagram of a distributed system 1600. In the illustrated example, distributed system 1600 includes one or more client computing devices 1602, 1604, 1606, and 1608, coupled to a server 1612 via one or more communication networks 1610. Clients computing devices 1602, 1604, 1606, and 1608 may be configured to execute one or more applications.

In various examples, server 1612 may be adapted to run one or more services or software applications that enable one or more embodiments described in this disclosure. In certain examples, server 1612 may also provide other services or software applications that may include non-virtual and virtual environments. In some examples, these services may be offered as web-based or cloud services, such as under a Software as a Service (SaaS) model to the users of client computing devices 1602, 1604, 1606, and/or 1608. Users operating client computing devices 1602, 1604, 1606, and/or 1608 may in turn utilize one or more client applications to interact with server 1612 to utilize the services provided by these components.

In the configuration depicted in FIG. 16, server 1612 may include one or more components 1618, 1620 and 1622 that implement the functions performed by server 1612. These components may include software components that may be executed by one or more processors, hardware components, or combinations thereof. It should be appreciated that various different system configurations are possible, which may be different from distributed system 1600. The example shown in FIG. 16 is thus one example of a distributed system for implementing an example system and is not intended to be limiting.

Users may use client computing devices 1602, 1604, 1606, and/or 1608 to execute one or more applications, which may generate one or more storage requests that may then be serviced in accordance with the teachings of this disclosure. A client device may provide an interface that enables a user of the client device to interact with the client device. The client device may also output information to the user via this interface. Although FIG. 16 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1610 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1610 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1612 may include one or more virtual machines running virtual operating systems, or other computing architectures involving virtualization such as one or more flexible pools of logical storage devices that may be virtualized to maintain virtual storage devices for the server. In various examples, server 1612 may be adapted to run one or more services or software applications that provide the functionality described in the foregoing disclosure.

The computing systems in server 1612 may run one or more operating systems including any of those discussed above, as well as any commercially available server operating system. Server 1612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1612 may include one or more applications to analyze and consolidate data feeds and/or event updates received from users of client computing devices 1602, 1604, 1606, and 1608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1612 may also include one or more applications to display the data feeds and/or real-time events via one or more display devices of client computing devices 1602, 1604, 1606, and 1608.

Distributed system 1600 may also include one or more data repositories 1614, 1616. These data repositories may be used to store data and other information in certain examples. For example, one or more of the data repositories 1614, 1616 may be used to store information such as information related to storage virtual machines, information mapping application IDs to application to selected storage virtual machines, and other information used by server 1612 when performing authentication functions. Data repositories 1614, 1616 may reside in a variety of locations. For example, a data repository used by server 1612 may be local to server 1612 or may be remote from server 1612 and in communication with server 1612 via a network-based or dedicated connection. Data repositories 1614, 1616 may be of different types. In certain examples, a data repository used by server 1612 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 1614, 1616 may also be used by applications to store application data. The data repositories used by applications may be of different types such as, for example, a key-value store repository, an object store repository, or a general storage repository supported by a file system.

Figure 17:
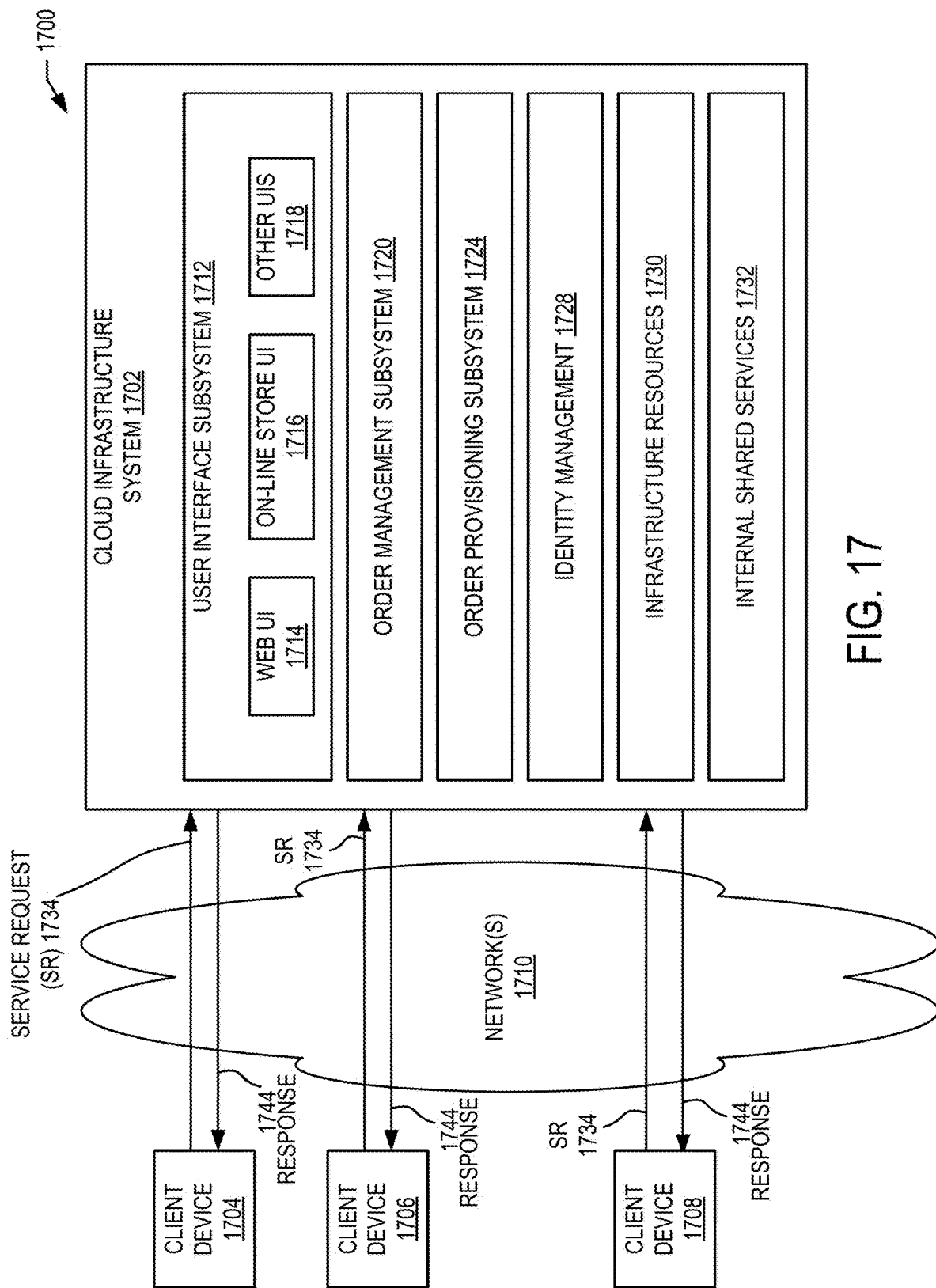
FIG. 17 is a simplified block diagram of a cloud-based system environment for implementing some embodiments.

In certain examples, the functionalities described in this disclosure may be offered as services via a cloud environment. FIG. 17 is a simplified block diagram of a cloud-based system environment in which various services may be offered as cloud services in accordance with certain examples. In the example depicted in FIG. 17, cloud infrastructure system 1702 may provide one or more cloud services that may be requested by users using one or more client computing devices 1704, 1706, and 1708. Cloud infrastructure system 1702 may comprise one or more computers and/or servers that may include those described above for server 1612. The computers in cloud infrastructure system 1702 may be organized as general purpose computers, specialized server computers, server farms, server clusters, or any other appropriate arrangement and/or combination.

Network(s) 1710 may facilitate communication and exchange of data between clients 1704, 1706, and 1708 and cloud infrastructure system 1702. Network(s) 1710 may include one or more networks. The networks may be of the same or different types. Network(s) 1710 may support one or more communication protocols, including wired and/or wireless protocols, for facilitating the communications.

The example depicted in FIG. 17 is only one example of a cloud infrastructure system and is not intended to be limiting. It should be appreciated that, in some other examples, cloud infrastructure system 1702 may have more or fewer components than those depicted in FIG. 17, may combine two or more components, or may have a different configuration or arrangement of components. For example, although FIG. 17 depicts three client computing devices, any number of client computing devices may be supported in alternative examples.

The term cloud service is generally used to refer to a service that is made available to users on demand and via a communication network such as the Internet by systems (e.g., cloud infrastructure system 1702) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain examples, cloud infrastructure system 1702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1702. Cloud infrastructure system 1702 then performs processing to provide the services requested in the customer's subscription order. For example, a user may request the cloud infrastructure system to register an application, as described above, and provide services to the application per the application's specified requirements. Cloud infrastructure system 1702 may be configured to provide one or even multiple cloud services.

Cloud infrastructure system 1702 may provide the cloud services via different deployment models. In a public cloud model, cloud infrastructure system 1702 may be owned by a third party cloud services provider and the cloud services are offered to any general public customer, where the customer may be an individual or an enterprise. In certain other examples, under a private cloud model, cloud infrastructure system 1702 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 1702 and the services provided may be shared by several organizations in a related community. Various other models such as hybrids of the above mentioned models may also be used.

Client computing devices 1704, 1706, and 1708 may be of different types (such as client computing devices 1602, 1604, 1606, and 1608 depicted in FIG. 16) and may be capable of operating one or more client applications. A user may use a client device to interact with cloud infrastructure system 1702, such as to request a service provided by cloud infrastructure system 1702. For example, a user may use a client device to request an authentication-related service described in this disclosure.

In some examples, the processing performed by cloud infrastructure system 1702 for providing services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 1702 for determining which storage virtual machine is to be selected for a particular application based upon the application's stated authentication-related requirements. The data used for this analysis may include structured data (e.g., data stored in a database or structured according to a structured model) and/or unstructured data (e.g., data blobs (binary large objects)).

As depicted in the example in FIG. 17, cloud infrastructure system 1702 may include infrastructure resources 1730 that are utilized for facilitating the provision of various cloud services offered by cloud infrastructure system 1702. Infrastructure resources 1730 may include, for example, processing resources, storage or memory resources, networking resources, and the like. In certain examples, the storage virtual machines that are available for servicing storage requested from applications may be part of cloud infrastructure system 1702. In other examples, the storage virtual machines may be part of different systems.

In certain examples, to facilitate efficient provisioning of these resources for supporting the various cloud services provided by cloud infrastructure system 1702 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1702 may itself internally use services 1732 that are shared by different components of cloud infrastructure system 1702 and which facilitate the provisioning of services by cloud infrastructure system 1702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1702 may comprise multiple subsystems. These subsystems may be implemented in software, or hardware, or combinations thereof. As depicted in FIG. 17, the subsystems may include a user interface subsystem 1712 that enables users or customers of cloud infrastructure system 1702 to interact with cloud infrastructure system 1702. User interface subsystem 1712 may include various different interfaces such as a web interface 1714, an online store interface 1716 where cloud services provided by cloud infrastructure system 1702 are advertised and are purchasable by a consumer, and other interfaces 1718. For example, a customer may, using a client device, request (service request 1734) one or more services provided by cloud infrastructure system 1702 using one or more of interfaces 1714, 1716, and 1718. For example, a customer may access the online store, browse cloud services offered by cloud infrastructure system 1702, and place a subscription order for one or more services offered by cloud infrastructure system 1702 that the customer wishes to subscribe to. The service request may include information identifying the customer and one or more services that the customer desires to subscribe to. For example, a customer may place a subscription order for a service offered by cloud infrastructure system 1702. As part of the order, the customer may provide information identifying an application for which the service is to be provided and the one or more credentials for the application.

In certain examples, such as the example depicted in FIG. 17, cloud infrastructure system 1702 may comprise an order management subsystem (OMS) 1720 that is configured to process the new order. As part of this processing, OMS 1720 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1720 may then invoke the order provisioning subsystem (OPS) 1724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 1702 as part of the provisioning process. Cloud infrastructure system 1702 may generate an application ID and select a storage virtual machine for an application from among storage virtual machines provided by cloud infrastructure system 1702 itself or from storage virtual machines provided by other systems other than cloud infrastructure system 1702.

Cloud infrastructure system 1702 may send a response or notification 1744 to the requesting customer to indicate when the requested service is now ready for use. In some instances, information (e.g., a link) may be sent to the customer that enables the customer to start using and availing the benefits of the requested services. In certain examples, for a customer requesting the service, the response may include an application ID generated by cloud infrastructure system 1702 and information identifying a virtual machine selected by cloud infrastructure system 1702 for an application corresponding to the application ID.

Cloud infrastructure system 1702 may provide services to multiple customers. For each customer, cloud infrastructure system 1702 is responsible for managing information related to one or more subscription orders received from the customer, maintaining customer data related to the orders, and providing the requested services to the customer. Cloud infrastructure system 1702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1702 may provide services to multiple customers in parallel. Cloud infrastructure system 1702 may store information for these customers, including possibly proprietary information. In certain examples, cloud infrastructure system 1702 comprises an identity management subsystem (IMS) 1728 that is configured to manage customer information and provide the separation of the managed information such that information related to one customer is not accessible by another customer. IMS 1728 may be configured to provide various security-related services such as identity services, such as information access management, authentication and authorization services, services for managing customer identities and roles and related capabilities, and the like.

Figure 18:
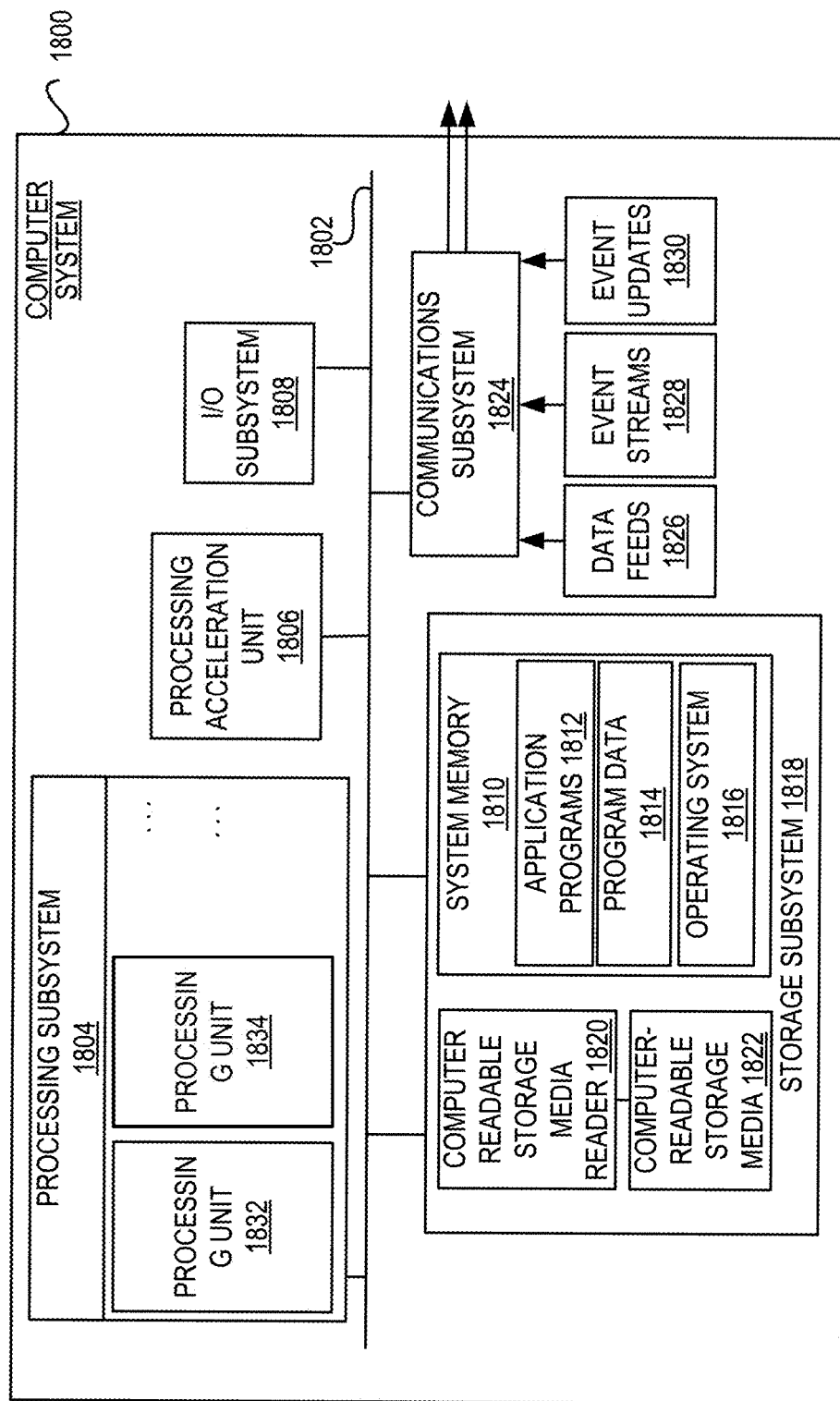
FIG. 18 illustrates an example of a computer system for implementing some embodiments.

FIG. 18 illustrates an example of computer system 1800. In some examples, computer system 1800 may be used to implement any of the application system, access management system, systems within a data center, and various servers and computer systems described above. As shown in FIG. 18, computer system 1800 includes various subsystems including a processing subsystem 1804 that communicates with a number of other subsystems via a bus subsystem 1802. These other subsystems may include a processing acceleration unit 1806, an I/O subsystem 1808, a storage subsystem 1818, and a communications subsystem 1824. Storage subsystem 1818 may include non-transitory computer-readable storage media including storage media 1822 and a system memory 1810.

Bus subsystem 1802 provides a mechanism for letting the various components and subsystems of computer system 1800 communicate with each other as intended. Although bus subsystem 1802 is shown schematically as a single bus, alternative examples of the bus subsystem may utilize multiple buses. Bus subsystem 1802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1804 controls the operation of computer system 1800 and may comprise one or more processors, application specific integrated circuits (ASICs), or field programmable gate arrays (FPGAs). The processors may include be single core or multicore processors. The processing resources of computer system 1800 may be organized into one or more processing units 1832, 1834, etc. A processing unit may include one or more processors, one or more cores from the same or different processors, a combination of cores and processors, or other combinations of cores and processors. In some examples, processing subsystem 1804 may include one or more special purpose co-processors such as graphics processors, digital signal processors (DSPs), or the like. In some examples, some or all of the processing units of processing subsystem 1804 may be implemented using customized circuits, such as application specific integrated circuits (ASICs), or field programmable gate arrays (FPGAs).

In some examples, the processing units in processing subsystem 1804 may execute instructions stored in system memory 1810 or on computer readable storage media 1822. In various examples, the processing units may execute a variety of programs or code instructions and may maintain multiple concurrently executing programs or processes. At any given time, some or all of the program code to be executed may be resident in system memory 1810 and/or on computer-readable storage media 1822 including potentially on one or more storage devices. Through suitable programming, processing subsystem 1804 may provide various functionalities described above. In instances where computer system 1800 is executing one or more virtual machines, one or more processing units may be allocated to each virtual machine.

In certain examples, a processing acceleration unit 1806 may optionally be provided for performing customized processing or for off-loading some of the processing performed by processing subsystem 1804 so as to accelerate the overall processing performed by computer system 1800.

I/O subsystem 1808 may include devices and mechanisms for inputting information to computer system 1800 and/or for outputting information from or via computer system 1800. In general, use of the term input device is intended to include all possible types of devices and mechanisms for inputting information to computer system 1800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1818 provides a repository or data store for storing information and data that is used by computer system 1800. Storage subsystem 1818 provides a tangible non-transitory computer-readable storage medium for storing the basic programming and data constructs that provide the functionality of some examples. Storage subsystem 1818 may store software (e.g., programs, code modules, instructions) that when executed by processing subsystem 1804 provides the functionality described above. The software may be executed by one or more processing units of processing subsystem 1804. Storage subsystem 1818 may also provide authentication in accordance with the teachings of this disclosure.

Storage subsystem 1818 may include one or more non-transitory memory devices, including volatile and non-volatile memory devices. As shown in FIG. 18, storage subsystem 1818 includes a system memory 1810 and a computer-readable storage media 1822. System memory 1810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1800, such as during start-up, may typically be stored in the ROM. The RAM typically contains data and/or program modules that are presently being operated and executed by processing subsystem 1804. In some implementations, system memory 1810 may include multiple different types of memory, such as static random access memory (SRAM), dynamic random access memory (DRAM), and the like.

By way of example, and not limitation, as depicted in FIG. 18, system memory 1810 may load application programs 1812 that are being executed, which may include various applications such as Web browsers, mid-tier applications, relational database management systems (RDBMS), etc., program data 1814, and an operating system 1816. By way of example, operating system 1816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1822 may store programming and data constructs that provide the functionality of some examples. Computer-readable media 1822 may provide storage of computer-readable instructions, data structures, program modules, and other data for computer system 1800. Software (programs, code modules, instructions) that, when executed by processing subsystem 1804 provides the functionality described above, may be stored in storage subsystem 1818. By way of example, computer-readable storage media 1822 may include non-volatile memory such as a hard disk drive, a magnetic disk drive, an optical disk drive such as a CD ROM, DVD, a Blu-Ray® disk, or other optical media. Computer-readable storage media 1822 may include, but is not limited to, Zip® drives, flash memory cards, universal serial bus (USB) flash drives, secure digital (SD) cards, DVD disks, digital video tape, and the like. Computer-readable storage media 1822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 1818 may also include a computer-readable storage media reader 1820 that may further be connected to computer-readable storage media 1822. Reader 1820 may receive and be configured to read data from a memory device such as a disk, a flash drive, etc.

In certain examples, computer system 1800 may support virtualization technologies, including but not limited to virtualization of processing and memory resources. For example, computer system 1800 may provide support for executing one or more virtual machines. In certain examples, computer system 1800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1800. Accordingly, multiple operating systems may potentially be run concurrently by computer system 1800.

Communications subsystem 1824 provides an interface to other computer systems and networks. Communications subsystem 1824 serves as an interface for receiving data from and transmitting data to other systems from computer system 1800. For example, communications subsystem 1824 may enable computer system 1800 to establish a communication channel to one or more client devices via the Internet for receiving and sending information from and to the client devices. For example, when computer system 1800 is used to implement bot system 120 depicted in FIG. 1, the communication subsystem may be used to communicate with an application system and also a system executing a storage virtual machine selected for an application.

Communication subsystem 1824 may support both wired and/or wireless communication protocols. In certain examples, communications subsystem 1824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 1824 may provide wired network connectivity (e.g., Ethernet) in addition to or instead of a wireless interface.

Communication subsystem 1824 may receive and transmit data in various forms. In some examples, in addition to other forms, communications subsystem 1824 may receive input communications in the form of structured and/or unstructured data feeds 1826, event streams 1828, event updates 1830, and the like. For example, communications subsystem 1824 may be configured to receive (or send) data feeds 1826 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 1824 may be configured to receive data in the form of continuous data streams, which may include event streams 1828 of real-time events and/or event updates 1830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1824 may also be configured to communicate data from computer system 1800 to other computer systems or networks. The data may be communicated in various different forms such as structured and/or unstructured data feeds 1826, event streams 1828, event updates 1830, and the like to one or more databases that may be in communication with one or more streaming data source computers coupled to computer system 1800.

Computer system 1800 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1800 depicted in FIG. 18 is intended only as a specific example. Many other configurations having more or fewer components than the system depicted in FIG. 18 are possible. Based on the disclosure and teachings provided herein, a person of ordinary skill in the art will appreciate other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method of generating a hierarchical classification model for classifying an input into a class in a plurality of classes, the method comprising:
    associating, by a computer system, the plurality of classes with a root node on a first layer of a tree structure representing the hierarchical classification model, the hierarchical classification model including a plurality of classification models;
    generating, by the computer system, the tree structure for the hierarchical classification model, wherein:
        the tree structure includes leaf nodes and non-leaf nodes;
        each non-leaf node has two child nodes associated with two respective sets of classes in the plurality of classes, wherein a difference between numbers of classes in the two sets of classes is zero or one;
        each leaf node is associated with at least two but fewer than a first threshold number of classes; and
        each of the leaf nodes and the non-leaf nodes is associated with a classification model in the plurality of classification models of the hierarchical classification model; and
    training, independently by one or more computer systems, the classification model associated with each respective node in the tree structure, thereby generating the hierarchical classification model for classifying the input into the class in the plurality of classes.

2. The computer-implemented method of claim 1, wherein generating the tree structure comprises:
    assigning the plurality of classes to two child nodes on a second layer of the tree structure, wherein a difference between numbers of classes associated with the two child nodes on the second layer is zero or one; and
    assigning, based on determining that the number of classes associated with a child node on the second layer is equal to or greater than the first threshold number, classes associated with the child node on the second layer to two child nodes on a third layer of the tree structure, wherein a difference between numbers of classes associated with the two child nodes on the third layer is zero or one.

3. The computer-implemented method of claim 2, wherein assigning the plurality of classes to the two child nodes on the second layer comprises selecting, randomly from the plurality of classes, classes to be associated with each of the two child nodes on the second layer.

4. The computer-implemented method of claim 1, wherein training the classification model associated with each respective node in the tree structure comprises:
    training, for a non-leaf node, a binary classification model for classifying inputs into two groups of classes, each group associated with a respective child node of the two child nodes of the non-leaf node; or
    training, for a leaf node, a multiclass classification model for classifying inputs into individual classes associated with the leaf node.

5. The computer-implemented method of claim 4, wherein the binary classification model includes a support vector machine (SVM) classifier, a logistic regression classifier, a naive Bayes classifier, a decision tree classifier, a nearest neighbor classifier, or a neural network classifier.

6. The computer-implemented method of claim 4, wherein the multiclass classification model is configured to classify the inputs into two or more individual classes in the plurality of classes.

7. The computer-implemented method of claim 4, wherein the multiclass classification model includes a multiclass support vector machine (SVM) classifier, a K-nearest neighbors classifier, or a neural network classifier.

8. The computer-implemented method of claim 1, wherein training the classification model associated with each respective node in the tree structure comprises:
    training, concurrently, multiple classification models associated with multiple nodes in the tree structure.

9. The computer-implemented method of claim 1, wherein the computer system includes a computer, a server, a distributed computer system, or a cloud-based computer system.

10. The computer-implemented method of claim 9, wherein training the classification model associated with each respective node in the tree structure comprises:
    training, concurrently on a same processor or on different processors of the computer system, multiple classification models associated with multiple nodes in the tree structure.

11. The computer-implemented method of claim 1, further comprising:
    retraining or updating a classification model for a node in the tree structure without retraining or updating other classification models for other nodes in the tree structure.

12. The computer-implemented method of claim 1, wherein the first threshold number is 6 or fewer.

13. The computer-implemented method of claim 1, wherein the leaf nodes are on a same layer of the tree structure.

14. The computer-implemented method of claim 1, wherein a number of layers of the tree structure is fewer than a second threshold number, the first threshold number determined based on the second threshold number.

15. The computer-implemented method of claim 1, wherein:
the input corresponds to a user utterance to a chatbot; and
the plurality of classes corresponds to user intents associated with user utterances.

16. The computer-implemented method of claim 1, wherein the plurality of classes includes 20 or more classes.

17. A non-transitory computer readable medium storing a plurality of instructions executable by one or more processors, wherein the plurality of instructions, when executed by the one or more processors, causes the one or more processors to perform processing comprising:
associating a plurality of classes with a root node on a first layer of a tree structure representing a hierarchical classification model, the hierarchical classification model including a plurality of classification models;
generating the tree structure for the hierarchical classification model, wherein:
the tree structure includes leaf nodes and non-leaf nodes;
each non-leaf node has two child nodes associated with two respective sets of classes in the plurality of classes, wherein a difference between numbers of classes in the two sets of classes is zero or one;
each leaf node is associated with at least two but fewer than a first threshold number of classes; and
each of the leaf nodes and the non-leaf nodes is associated with a classification model in the plurality of classification models of the hierarchical classification model; and
training the classification model associated with each respective node in the tree structure, thereby generating the hierarchical classification model for classifying input into a class in the plurality of classes.

18. The non-transitory computer readable medium of claim 17, generating the tree structure comprises:
assigning the plurality of classes to two child nodes on a second layer of the tree structure, wherein a difference between numbers of classes associated with the two child nodes on the second layer is zero or one; and
assigning, based on determining that the number of classes associated with a child node on the second layer is equal to or greater than the first threshold number, classes associated with the child node on the second layer to two child nodes on a third layer of the tree structure, wherein a difference between numbers of classes associated with the two child nodes on the third layer is zero or one.

19. The non-transitory computer readable medium of claim 17, wherein training the classification model associated with each respective node in the tree structure comprises:
training, concurrently, multiple classification models associated with multiple nodes in the tree structure.

20. A system comprising:
one or more processors; and
a memory coupled to the one or more processors, the memory storing instructions, which, when executed by the one or more processors, cause the system to:
associate a plurality of classes with a root node on a first layer of a tree structure representing a hierarchical classification model, the hierarchical classification model including a plurality of classification models;
generate the tree structure for the hierarchical classification model, wherein:
the tree structure includes leaf nodes and non-leaf nodes;
each non-leaf node has two child nodes associated with two respective sets of classes in the plurality of classes, wherein a difference between numbers of classes in the two sets of classes is zero or one;
each leaf node is associated with at least two but fewer than a first threshold number of classes; and
each of the leaf nodes and the non-leaf nodes is associated with a classification model in the plurality of classification models of the hierarchical classification model; and
train the classification model associated with each respective node in the tree structure, thereby generating the hierarchical classification model for classifying input into a class in the plurality of classes.

* * * * *

UNITED STATES PATENT AND TRADEMARK OFFICE
CERTIFICATE OF CORRECTION

| | |
|---|---|
| PATENT NO. | : 11,551,135 B2 |
| APPLICATION NO. | : 16/147270 |
| DATED | : January 10, 2023 |
| INVENTOR(S) | : Singaraju et al. |

It is certified that error appears in the above-identified patent and that said Letters Patent is hereby corrected as shown below:

In the Drawings

On sheet 17 of 19, in FIG. 16, under Reference Numeral 1616, Lines 2-3, delete "REPOSITOR Y" and insert -- REPOSITORY --, therefor.

On sheet 19 of 19, in FIG. 18, under Reference Numeral 1832, Lines 1-2, delete "PROCESSIN G UNIT" and insert -- PROCESSING UNIT --, therefor.

On sheet 19 of 19, in FIG. 18, under Reference Numeral 1834, Lines 1-2, delete "PROCESSIN G UNIT" and insert -- PROCESSING UNIT --, therefor.

In the Specification

In Column 4, Line 18, delete "embodiment." and insert -- embodiment; --, therefor.

In Column 10, Lines 25-26, delete "WHATSAPP" and insert -- WHATSAPP® --, therefor.

In Column 18, Line 61, delete "childe" and insert -- child --, therefor.

In Column 37, Line 15, delete "evolution)," and insert -- evolution)), --, therefor.

Signed and Sealed this
Twenty-fourth Day of September, 2024

*Katherine Kelly Vidal*
*Director of the United States Patent and Trademark Office*